United States Patent
Choi et al.

(10) Patent No.: US 7,200,135 B2
(45) Date of Patent: Apr. 3, 2007

(54) METHOD FOR MINIMIZING SEARCHING TIME FOR A TRANSPORT FORMAT SELECTION IN A CODE DIVISION MULTIPLE ACCESS MOBILE COMMUNICATION SYSTEM

(75) Inventors: Chi-Won Choi, Yongin-shi (KR); Goli Naga Santha Mohan Rao, R.T. Nagar Bangalore (IN); Ravikumar Kalaimani, Bangalore (IN); Lokendra Sharma, Bangalore (IN); Vinay Kulkarni, Bangalore (IN)

(73) Assignee: Samsung Electronics Co., Ltd. (KR)

( * ) Notice: Subject to any disclaimer, the term of this patent is extended or adjusted under 35 U.S.C. 154(b) by 899 days.

(21) Appl. No.: 10/400,760

(22) Filed: Mar. 27, 2003

(65) Prior Publication Data

US 2003/0185193 A1 Oct. 2, 2003

(30) Foreign Application Priority Data

Mar. 30, 2002 (KR) .................... 10-2002-0017655

(51) Int. Cl.
*H04B 7/212* (2006.01)

(52) U.S. Cl. .................... 370/348; 370/282; 370/524; 370/329; 370/437

(58) Field of Classification Search ................ 370/348, 370/282, 524, 329, 437
See application file for complete search history.

(56) References Cited

U.S. PATENT DOCUMENTS

| | | | | |
|---|---|---|---|---|
| 6,307,867 | B1 * | 10/2001 | Roobol et al. | 370/470 |
| 6,791,963 | B1 * | 9/2004 | Hwang et al. | 370/342 |
| 6,804,202 | B1 * | 10/2004 | Hwang | 370/282 |
| 2001/0043578 | A1 * | 11/2001 | Kumar et al. | 370/331 |
| 2002/0075867 | A1 * | 6/2002 | Herrmann | 370/389 |
| 2002/0196760 | A1 * | 12/2002 | Malomsoky et al. | 370/338 |

FOREIGN PATENT DOCUMENTS

| | | |
|---|---|---|
| EP | 1 006 692 A1 | 6/2000 |
| EP | 1 104 216 A1 | 5/2001 |
| WO | WO 00/28760 | 5/2000 |
| WO | WO 01/17283 A2 | 3/2001 |
| WO | WO 02/49337 A1 | 6/2002 |

OTHER PUBLICATIONS

European Search Report dated Aug. 21, 2003, issued in a counterpart application, namely, Appln. No. 03007304.3.

* cited by examiner

*Primary Examiner*—Danh Cong Le
(74) *Attorney, Agent, or Firm*—The Farrell Law Firm

(57) ABSTRACT

A method for minimizing searching time for a transport format selection in a CDMA communication system including an RLC layer and an MAC layer. The RLC layer entity contains a plurality of logical channels and transmits input data to the MAC layer through a specific logical channel from among the logical channels. The MAC layer contains a plurality of transport channels and transmits the input data to a physical layer through a specific transport channel from among the transport channels. Transport formats are generated for the transport channels, and classified according to sizes of data that can be transmitted by corresponding transport channels. An indicator is provided to each of the transport formats classified according to data size, and a plurality of subset tables are generated. When the data is input to the MAC layer, after the subset tables are generated, a subset table having a same size as the data input to the MAC layer is detected, and a transport format corresponding to a specific indicator is selected.

8 Claims, 18 Drawing Sheets

METHOD FOR MINIMIZING SEARCHING TIME FOR A TRANSPORT FORMAT SELECTION IN A CODE DIVISION MULTIPLE ACCESS MOBILE COMMUNICATION SYSTEM

PRIORITY

This application claims priority to an application entitled "Method for Minimizing Searching Time for Transport Format Selection in Code Division Multiple Access Mobile Communication System" filed in the Korean Industrial Property Office on Mar. 30, 2002 and assigned Serial No. 2002-17655, the contents of which are hereby incorporated by reference.

BACKGROUND OF THE INVENTION

1. Field of the Invention

The present invention relates generally to a code division multiple access mobile communication system, and more particularly to a method for minimizing searching time for a transport format selection in a code division multiple access mobile communication system.

2. Description of the Related Art

In general, code division multiple access communication (CDMA) systems can be classified into synchronous systems and asynchronous systems. The asynchronous systems include a Universal Mobile Terrestrial System (hereinafter, referred to as "UMTS").

FIG. 1 schematically illustrates a layer structure of a conventional CDMA mobile communication system. Referring to FIG. 1, a Radio Resource Control (hereinafter, referred to as "RRC") layer 111 transmits a control message for transport format selection to a Medium Access Control (hereinafter, referred to as "MAC") layer 115. In this case, the RRC layer 111 transmits the control message for the transport format selection and also a plurality of control messages for controlling the operation of the MAC layer 115. Further, a Radio Link Control (hereinafter, referred to as "RLC") layer 113 receives a Service Data Unit (SDU) from a higher layer and compares the received SDU with a Protocol Data Unit (PDU). When the received SDU is smaller than the PDU, the RLC layer 113 concatenates the received SDU with other SDUs, so as to generate a PDU having a suitable size. In contrast, when the received SDU is larger than the PDU, the RLC layer 113 segments the received SDU, to generate a PDU having a suitable size. Further, the RLC layer 113 transfers the generated PDUs to the MAC layer 115 through a logical channel.

The UMTS channels can be classified into physical channels, transport channels, and logical channels. The physical channels include downlink channels such as a Physical Downlink Shared Channel (PDSCH), a Dedicated Physical Control Channel (DPCCH), and a Dedicated Physical Data Channel (DPDCH), and uplink channels such as a Dedicated Physical Channel (DPCH). The logical channels can be represented by Dedicated Channels (DCHs), which include a Dedicated Control Channel (DCCH) and a Dedicated Traffic Channel (DTCH). The transport channels include a Random Access Channel (RACH) and a Common Packet Channel (CPCH).

The MAC layer 115 receives a Transport Block Set (TBS) from the physical layer (PHY) 117, divides the received TBS into Transport Blocks (TBs), converts the divided TBs into PDUs, and transfers the PDUs to the RLC layer 113. Then, the RLC layer 113 converts the received PDUs into SDUs and transfers the SDUs to the higher layer. In contrast, the MAC layer 115 receives a PDU from the RLC layer 113, divides the received PDU into TBs, which are real units transmitted through the transport channel, and transfers the TBs to the physical layer 117. The physical layer 117 converts the TBs received from the MAC layer 115 into radio frames, which are real units transmitted from the physical layer, and transmits the radio frames over the air through a corresponding physical channel.

Primitives are utilized in data transmission between the layers described above, that is, the RRC layer 111, the RLC layer 113, and the physical layer 117. Buffers for storing data, such as a shared memory, are interposed between the MAC layer 115 and the RLC layer 113 and/or between the MAC layer 115 and the physical layer 117. In other words, the RLC layer 113 converts the SDUs received from the higher layer into the PDUs, buffers the PDUs in a Dedicated Control Channel/Dedicated Transport Channel (DCCH/DTCH) buffer 119, and reports the buffering to the MAC layer 115 through primitives. Further, whenever the PDUs must be read, the MAC layer 115 reads the PDUs stored in the DCCH/DTCH buffer 119 and maps them onto the transport channel. In other words, according to necessities or when the MAC layer 115 receives primitives from other layers, the MAC layer 115 reads the PDUs stored in the DCCH/DTCH buffer 119 and maps them onto the transport channel, generates TBs by multiplexing and adding headers of the MAC layer 115 according to the type of the mapped transport channel, and transmits data to L1 (Layer 1) for the transport channel. Further, the MAC layer 115 buffers the generated TBs into the transport channel buffer 121. When the TBs must be transmitted, the physical layer 117 reads and transmits the TBs stored in the transport channel buffer 121.

Hereinafter, TBs transmitted through the same single transport channel during one Transmission Time Interval (hereinafter, referred to as "TTI") will be called a "Transport Block Set (TBS)", the number of bits in each TB of the TBS will be called a "transport block size", and the number of the TBs constituting the TBS will be called a "Transport Block Set Size (TBSS)". In this case, a node B reports the TBSS to a User Equipment (hereinafter, referred to as "UE"), so that the number of bits rate-matched in a physical layer of the UE can be estimated. In this case, the rate matching scheme is information indicating the type in which repetition or puncturing has been performed when the physical layer of the UE has repeated or punctured UE data. Further, as described above, the UE can simultaneously set a plurality of transport channels corresponding to its transmission characteristics (for example, transport channels capable of providing various error correction functions). Each of the transport channels may be utilized in transmitting an information stream of one radio bearer or in transmitting L2 (Layer 2) and a higher layer signaling message. Mapping and transmitting the transport channels onto and through the same or different physical channels are implemented by the physical channel mapping operation of the physical channel 117.

The characteristics of the transport channels are determined according to the channel coding scheme employed in the transport channel, e.g., a convolutional coding scheme, and the Transport Format (TF) or the Transport Format Set (TFS), which define processing in the physical layer, e.g., interleaving and service-specific rate matching. In other words, the transport format implies the set whose members are data processing schemes of the physical layer for the transport channel, and the transport channel usually defines the coding rate and the channel coding scheme in which the data transmitted through the corresponding transport channel have been coded, the size (transport block size) by which the data are divided and transmitted, and the number of TBs that can be transmitted during one TTI. Further, the timing of the TBs is exactly fixed to the frame timing of the physical layer 117, that is L1 (Layer 1). For example, the TB is generated at every 10 ms, that is, at every point of time which corresponds to a product obtained by multiplying 10 ms by an integer. Therefore, two different transport channels have different details in relation to the transport channels, which means different transport formats.

The transport format can be divided into two parts including a dynamic part and a semi-static part, as shown in Table 1.

TABLE 1

| Transport Format type | Attributes |
|---|---|
| Dynamic | Transport Block Size |
|  | TBS size |
| Semi-static | TTI |
|  | Error protection scheme |
|  | Type of error protection, turbo code, convolutional code or channel coding |
|  | Coding rate |
|  | Size of CRC |

In Table 1, the dynamic part includes information about a transport block size and a TBSS. The semi-static part includes information about TTI, a size of a Cyclic Redundancy Check (CRC), and an error protection scheme, which includes coding rate and channel coding scheme for error protection. Further, as described above, a transport format is assigned to each of the transport channels according to the characteristics of the mapped physical channel. In this case, the Transport Format Set (TFS) is a set whose members are all transport formats that can be assigned to the transport channels, and the Transport Format Indicator (TFI) is an identifier for identifying each element constituting the transport format set, that is, each of the transport formats. In this case, semi-static parts of all the transport formats are equal to the semi-static parts in the transport format set. Further, the transport block size and the TBSS information contained in the dynamic part are generated corresponding to the bit rate of the transport channel. Therefore, when the bit rate of the transport channel changes according to channel environments and/or service types, only the TBSS or both of the TBS and the TBSS can be changed. In this case, when the transmission rate of the transport channel is fixed or slowly changes, the transport format is mapped to the transport channel. In contrast, when the transmission rate of the transport channel rapidly changes, the transport format set is mapped to the transport channel.

Further, Transport Format Combination (TFC) indicates a combination of the transport formats transmitted to the physical layer 117 through a Coded Composite Transport Channel (CCTrCH) of the UE, which has one transport format for each transport channel, and Transport Format Combination Set (TFCS) indicates a set of the TFCs transmitted through the CCTrCH. In this case, the TFCS needs not include all TFCs of the corresponding transport channels. Further, since a plurality of TFCSs are generated, Transport Format Combination Indicators (TFCIs) are required to identify the TFCI being currently assigned to the transport channel. Therefore, when a transmitting-side of the communication entity, e.g., a node B, transmits a transport channel with a TFCI corresponding and mapped to the transport channel, a receiving-side of the communication entity, e.g., a UE, can decode and demultiplex the transport channel by analyzing the TFCI of the transport channel.

Further, since a plurality of transport channels can be time-division-multiplexed through the same physical channel, the UE should be capable of recognizing the transport channel to which the physical channel received at a predetermined point of time pertains. Therefore, the UE provides an indicator to each of the transport channels in order to differentiate and identify the transport channels. This indicator is the Transport Channel Indicator (TCI).

Whenever the RLC layer 113 transmits a data request signal, the RRC layer 111 transmits a control signal for selecting a transport format assigned to the transport channel construction to the MAC layer 115. The RRC layer 111 assigns priority values, for example, '1' to '8', to a plurality of logical channels, for example, 8 logical channels, between the RLC layer 113 and the MAC layer 115, to control scheduling of uplink data. In this case, from among the priority values, '1' is a value having the highest priority and '8' is a value having the lowest priority. The selection of TFCs in the UE depends on the priorities assigned to the logical channels by the RRC layer 111. Whenever the RLC layer 113 transmits a data request signal, the MAC layer 115 selects a proper transport format for data transmission under the control of the RRC layer 111. Further, in the transmission according to the priorities, some TBs from among the TBs of each of the logical channels may be interrupted and delayed for data transmission of another logical channel having the next-highest priority. In this case, this interruption of TBs for data transmission of another logical channel is also implemented under the control of the RRC layer 111, and the priority of the interrupted TBs is set to be '0' which is higher than the highest priority '1', so that the data having the priority of '0' can be transmitted prior to any other TBs.

Further, when the UE transmit power approaches the maximum transmit power that can be transmitted by the UE, and the internal loop for power control cannot be maintained any more due to the coverage problem, the UE assigns a transport format combination having a bit rate lower than that of the current transport format combination to the transport channel. When a bit rate of a logical channel that transfers data from a CODEC supporting the variable rate operation conflicts with the lower bit rate, the bit rate of the CODEC is changed to avoid the conflict. Further, the UE continuously measures whether the maximum transmit power of the UE can support the temporarily interrupted transport format combination. When the maximum transmit power of the UE can support the temporarily interrupted transport format combination, transport combinations are assigned to the transport channels in reconsideration of the temporarily interrupted transport format combination.

As described above, the MAC layer 115 performs a transport format selection in response only to the data transmission request of the RLC layer 113, has a transport format table including all transport formats which can be assigned for the transport format selection, and searches the transport format table under the control of the RRC layer 111 when data transmission is requested by the RLC layer 113, to select a transport format for the corresponding transport channel. However, searching the transport format table, which includes transport formats of all cases, in order to assign a transport format to one transport channel requires relatively too much time in the transport format selection and may cause an overload due to the transport format selection.

SUMMARY OF THE INVENTION

Accordingly, the present invention has been designed to solve the above-mentioned problems occurring in the prior art, and an object of the present invention is to provide a method for minimizing searching time for a transport format selection in a CDMA mobile communication system.

It is another object of the present invention to provide a method of selecting a transport format utilizing subsets generated according to transport block sizes in a CDMA mobile communication system.

In order to accomplish the above and other objects, there is provided a method of selecting a transport format of a transport channel for transmitting input data in a CDMA mobile communication system including a Radio Link Control (RLC) layer and a medium access control (MAC) layer, wherein the RLC layer has a plurality of logical channels, transmits input data to the MAC layer through a specific logical channel from among the logical channels, and wherein the MAC layer has a plurality of transport channels, transmits the input data to a physical layer through a specific transport channel from among the transport channels, and selects the transport format of the transport channel, the method comprising the steps of: generating transport formats for the transport channels, each of the transport formats containing logical channel information mapped onto a corresponding transport channel, and classifying the transport formats according to sizes of data which can be transmitted by corresponding transport channels; providing an indicator to each of the transport formats classified according to the sizes of data, and generating a plurality of subset tables, each of the subset tables containing elements which are indicators provided to transport formats having an equal data size; when the data is input to the MAC layer entity through the specific logical channel after the subset tables are generated, detecting a subset table having a size equal to that of the data input to the MAC layer; and selecting a transport format corresponding to a specific indicator from indicators stored in the detected subset table as the transport format of the transport channel for transmitting the data input to the MAC layer entity, the specific indicator containing logical channel information of the specific logical channel.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENT(S)

Figure 1:
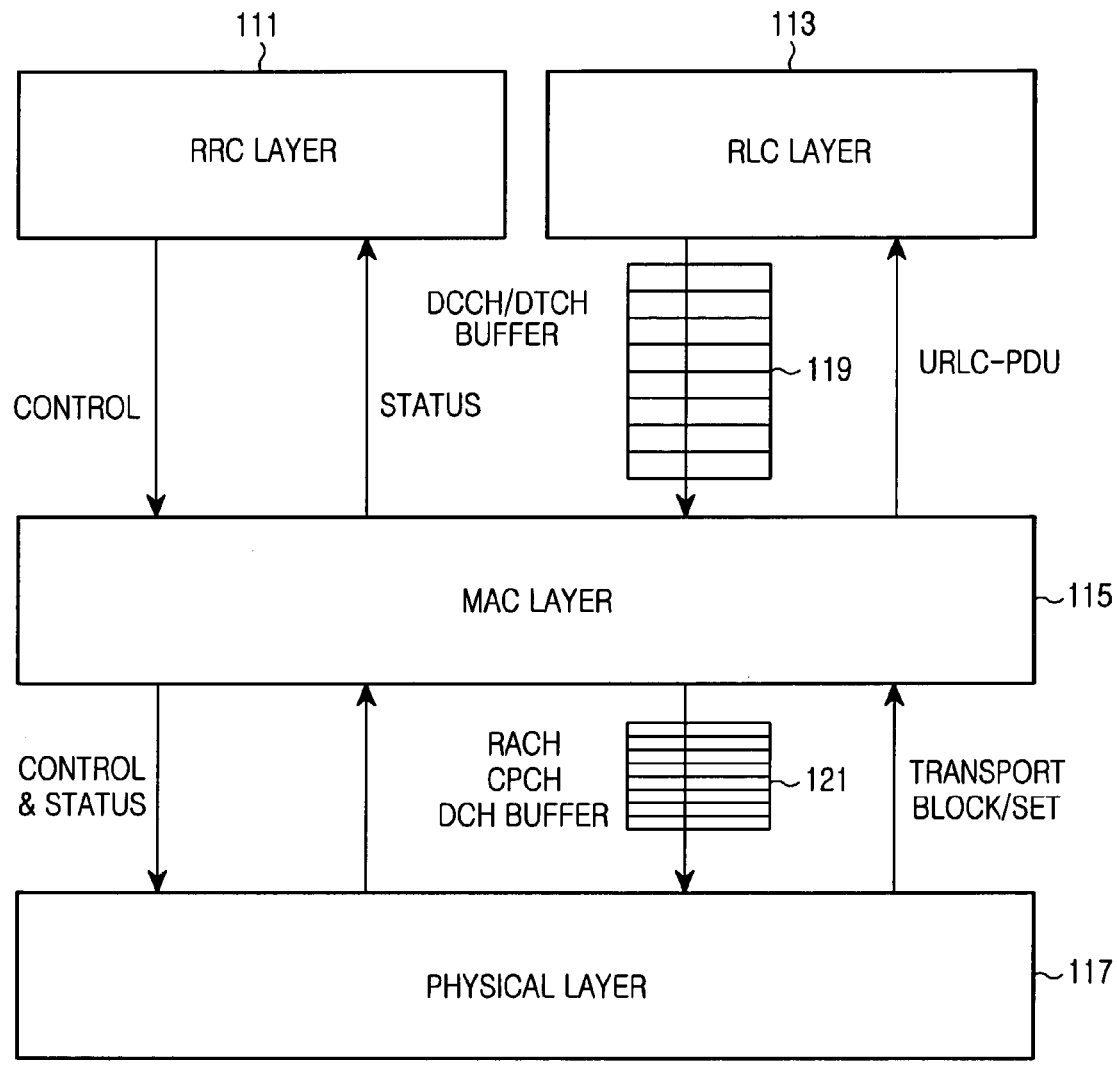
FIG. 1 schematically illustrates a layer structure of a conventional CDMA mobile communication system.

Preferred embodiments of the present invention will be described in detail herein below with reference to the accompanying drawings. In the following description of the present invention, same elements will be designated by same reference numerals although they are depicted in different drawings, and the specified examples such as circuit elements, as described above, are only for the understanding of the present invention, but it should be noted that the present invention is not limited to those examples. In the following description of the present invention, a detailed description of known functions and configurations incorporated herein will be omitted when it may make the subject matter of the present invention rather unclear.

A Code Division Multiple Access (CDMA) mobile communication system employing a method according to the present invention has the same layer structure as that illustrated in FIG. 1. However, the MAC layer 115 does not search the entire transport format table storing all assignable transport formats whenever selection of a transport format for a transport channel is required, as occurs in the prior art. Instead, the MAC layer 115 generates a plurality of transport format subsets according to predetermined priorities, which enable the MAC layer 115 to search only corresponding subset tables for the transport channel, thereby minimizing the searching time required in the transport format selection. According to the present invention, when a UE transmits data, the UE can generate transport format subset tables according to the size of data to be transmitted, and selects a transport format for the transport channel according to the size of the data by searching the transport format subset tables, thereby minimizing the searching time required in the transport format selection.

Figure 2:
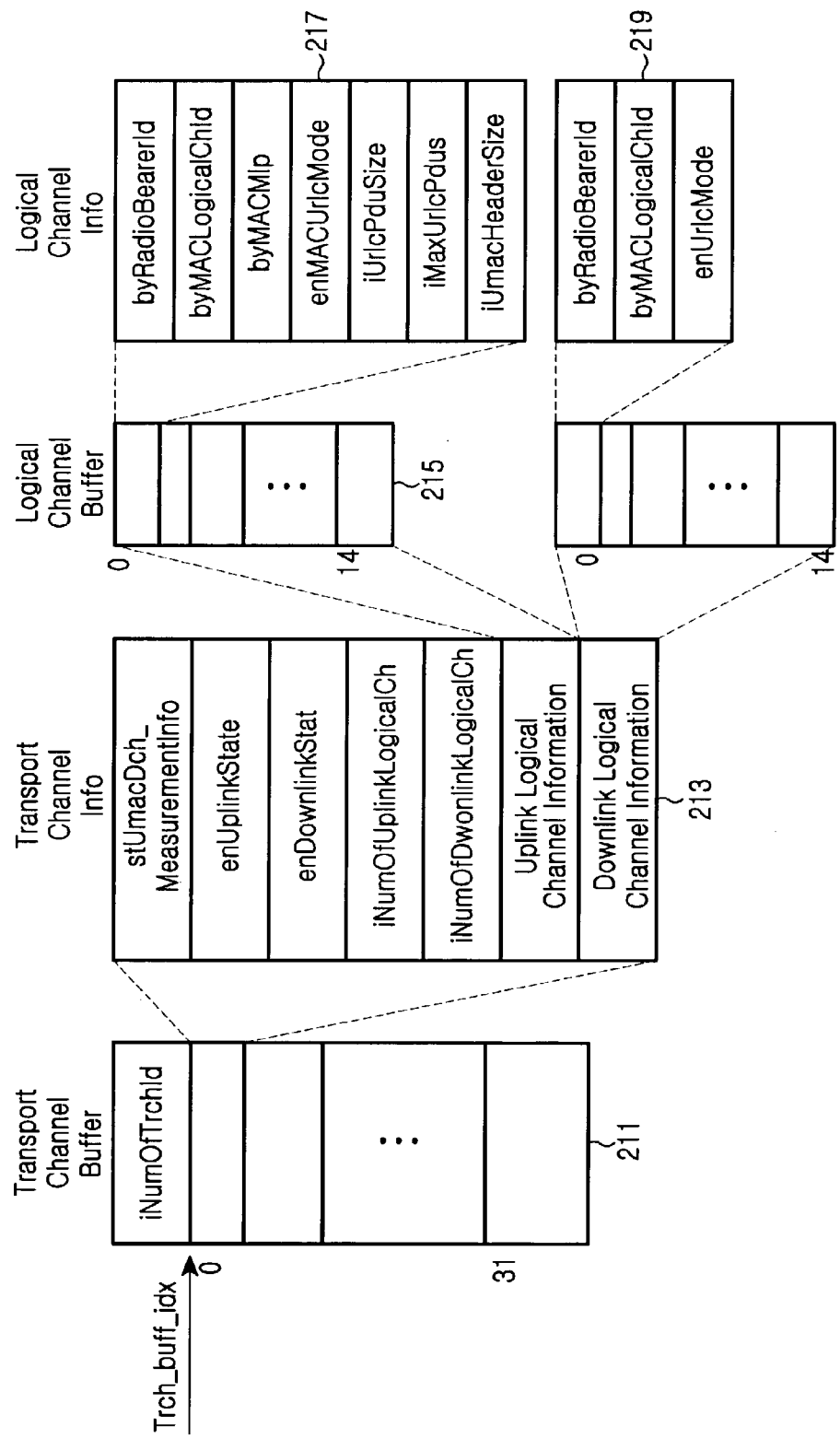
FIG. 2 schematically illustrates a structure of a transport format table of a conventional CDMA mobile communication system.

FIG. 2 schematically illustrates a structure of a transport format table of a conventional CDMA mobile communication system. As described with reference to FIG. 1, the RLC layer 113 receives a Service Data Unit (SDU) from a higher layer and compares the received SDU with a Protocol Data Unit (PDU). When the received SDU is smaller than the PDU, the RLC layer 113 concatenates the received SDU with other SDUs, so as to generate a PDU having a size suitable for the PDU. In contrast, when the received SDU is larger than the PDU, the RLC layer 113 segments the received service data, so as to generate a PDU having a suitable size. Also, the RLC layer 113 transfers the generated PDUs to the MAC layer 115 through logical channels. The MAC layer 115 having received the PDU from the RLC layer 113 divides the received PDU into TBs which are real units transmitted through the transport channel, and transfers the TBs to the physical layer 117. The physical layer 117 converts the TBs received from the MAC layer 115 into radio frames which are real units transmitted from the physical layer, and transmits the radio frames over the air through a corresponding physical channel. In this case, the MAC layer 115 buffers the generated TBs into the transport channel buffer 121 and reports the buffering to the physical layer 117. The physical layer 117 reads the TBs stored in the transport channel buffer 121 and converts them into radio frames, which are real units transmitted from the physical layer, according to necessity. The following description of FIG. 2 will be given assuming that the transport channel is a Dedicated Channel (DCH).

Referring to FIG. 2, the transport channel buffer 211 stores a transport format table, which contains information elements for a predetermined number of transport channels, e.g., 32 information elements for 32 transport channels. Each of the 32 information elements for the 32 transport channels is provided with a transport channel indicator (TrCHId), that is, a parameter iNumOfTrchId, for identification of each of the transport channels. The parameter iNumOfTrchId indicates the number of transport channels constituting the MAC layer 115. In the present embodiment, the value of the parameter iNumOfTrchId is set as 32, since the MAC layer 115 has 32 transport channels numbering '0' to '31'. When the MAC layer 115 has 16 transport channels instead of 32 transport channels, the parameter iNumOfTrchId has a value of 16.

The structure of each transport channel information element of the transport format table is defined for each of the 32 transport channels. The transport channel information element of the transport format table includes status measurement information stUmacDch_MeasurementInfo for dedicated channels constructed in the MAC layer 115. The stUmacDch_MeasurementInfo includes parameters enUplinkState, enDownlinkState, iNumOfUplinkLogicalCh, iNumOfDownlinkLogicalCh, UplinkLogicalChannelInformation, and DownlinkLogicalChannelInformation.

The parameters constituting the transport channel information element of the transport format table will be briefly described herein below.

(1) enUplinkState: The enUplinkState is information indicating a type of uplink dedicated channel, that is, information indicating whether the uplink dedicated channel is in an active state or an idle state. The enUplinkState includes a type DCH_IDLE indicating that the uplink dedicated channel is in the idle state and a type DCH_ACTIVE type indicating that the uplink dedicated channel is in the active state.

(2) enDownlinkState: The enDownlinkState is information indicating a type of the downlink dedicated channel, that is, information indicating whether the downlink dedicated channel is in an active state or an idle state. The enDownlinkState includes a type DCH_IDLE indicating that the downlink dedicated channel is in the idle state and a type DCH_ACTIVE indicating that the downlink dedicated channel is in the active state.

(3) iNumOfUplinkLogicalCh: The iNumOfUplinkLogicalCh indicates a number of logical channels constructed for the uplink transport channel. The present embodiment is based on an assumption that 15 logical channels numbering '1' to '15' are constructed for the uplink transport channel.

(4) iNumOfDownlinkLogicalCh: The iNumOfUplinkLogicalCh indicates a number of logical channels constructed for the downlink transport channel.

(5) UplinkLogicalChannelInformation: The UplinkLogicalChannelInformation includes information 217 about the logical channels constructed for the uplink transport channel, the description about which will be given below.

(6) DownlinkLogicalChannelInformation: The DownlinkLogicalChannelInformation includes information 217 about the logical channels constructed for the downlink transport channel, the description about which will be given below.

First, a structure of the UplinkLogicalChannelInformation will be described. As illustrated in FIG. 2, the UplinkLogicalChannelInformation includes a logical channel buffer 215 for storing information 217 about each of the logical channels constructed for the uplink transport channel. The logical channel buffer 215 contains information about each of the 15 logical channels. Parameters constituting the logical channel information 217 are byRadioBearerId, byMACLogicalChId, byMACMIp, enMACUrlcMode, iUrlcPduSize, iMaxUrlcPdus, and iUmacHeaderSize.

The parameters constituting the logical channel information will be briefly described below.

(1) byRadioBearerId: The byRadioBearerId is a Radio Bearer (RB) Indicator (RBID), which indicates a radio bearer assigned to a corresponding logical channel. In the preset embodiment, the number of the radio bearers is the same as the number of the transport channels, that is 32. Therefore, the byRadioBearerId indicates the radio bearer, which has been assigned to the corresponding logical channel from among the 32 radio bearers.

(2) byMACLogicalChId: The byMACLogicalChId is a logical channel indicator.

(3) byMaCMIp: The byMaCMIp is a logical channel priority.

(4) enMACUrlcMode: The enMACUrlcMode represents a mode of the RLC layer 113. That is, since the RLC layer 113 has three operation modes, which include a Transparent Mode (TM), an Unacknowledged Mode (UM), and an Acknowledged Mode (AM), the enMACUrlcMode represents the present operation mode of the RLC layer 113.

(5) iUrlcPduSize: The iUrlcPduSize represents a size of the PDU.

(6) iMaxUrlcPdus: The iMaxUrlcPdus represents the maximum number of TBs that are supported in the corresponding transport channel.

(7) iUmacHeaderSize: The iUmacHeaderSize represents a size of a header of the corresponding logical channel.

Second, a structure of the DownlinkLogicalChannelInformation will be described. As illustrated in FIG. 2, the DownlinkLogicalChannelInformation includes a logical channel buffer 215 for storing information 219 about each of the logical channels constructed for the downlink transport channel. The logical channel buffer 215 contains information about each of the 15 logical channels. Parameters constituting the logical channel information 219 are byRadioBearerId, byMACLogicalChId, and enUrlcMode.

The parameters constituting the logical channel information will be briefly described below.

(1) byRadioBearerId: The byRadioBearerId is a Radio Bearer Indicator (RBID), which indicates a radio bearer assigned to a logical channel. In the preset embodiment, the number of the radio bearers is the same as the number of the transport channels, that is 32. Therefore, the byRadioBearerId indicates the radio bearer which has been assigned to the corresponding logical channel from among the 32 radio bearers. In this case, the byRadioBearerId is set in accordance with "byGlbRadioBearerIdSyntype" which will be described later.

(2) byMACLogicalChId: The byMACLogicalChId is a logical channel indicator.

(3) enUrlcMode: The enUrlcMode represents the present operation mode of the RLC layer 113.

The structure of the transport format table as described above is shown in Table 2 below.

TABLE 2

| Sl. No. | PARAMETER DESCRIPTION | Description | DATA TYPE | VALUE | No. of Bytes |
|---|---|---|---|---|---|
| 1 | iNumOfTrchId | Total number of transport channels configured | Integer | 1 to 32 | 4 |
| 2 | Transport Channel Information | Structure containing information for the configured uplink and downlink transport channels | | 0 . . . 31 | |
| | >enUplinkState | Enum type indicating whether the corresponding uplink DCH is active or idle | Enum | DCH_IDLE/ DCH_ ACTIVE | 1 |
| | >enDownlinkState | Enum type indicating whether the corresponding downlink DCH is active or idle | Enum | DCH_IDLE/ DCH_ ACTIVE | 1 |
| | >iNumOfUplinkLogicalCh | Total number of logical channels configured for the particular uplink transport channel | Integer | 1 to 15 | 4 |
| | >NumOfDownlinkLogicalCh | Total number of logical channels configured for the particular downlink transport channel | Integer | 1 to 15 | 4 |
| | >Uplink Logical Channel Information | Structure containing information on configured logical channel for the uplink transport channel | 1 To 15 | | |
| | >>byRadioBearerId | RB D for the logical channel | Byte | 0 . . . 31 | 1 |
| | >>byUmacMlp | Logical channel priority (MLP) | Byte | 1 . . . 8 | 1 |
| | >>iRLCPduSize | RLC PDU size | Integer | | 4 |
| | >>byUmacLogicalChId | Logical channel id | Byte | 0 . . . 15 | 1 |
| | >>imaxRLCPdus | Maximum number of TBs supported for the corresponding transport channel | Integer | | 4 |
| | >>iUmacHeaderSize | Header size for the corresponding logical channel | Integer | | 4 |
| | >>enUmacRLCMode | RLC mode | Enum | (AM/TM/ UM) | 1 |
| | >Downlink Logical Channel Information | Structure containing information about configured logical channel for the downlink transport channel | 1 To 15 | | |
| | >>byRadioBearerId | RBID for the logical channel | byGlb-RadioBearer-IdSyn-type | 0 . . . 31 | 1 |
| | >>byUmacLogicalChId | Logical channel id | 0 To 15 | 0 . . . 15 | 1 |
| | >>enRLCMode | RLC mode | Enum | (AM/TM/ UM) | 1 |

In addition to the transport format table structure shown above, a global transport format set table (Global TFS table) will be described hereinafter, with reference to FIG. 3.

Figure 3:
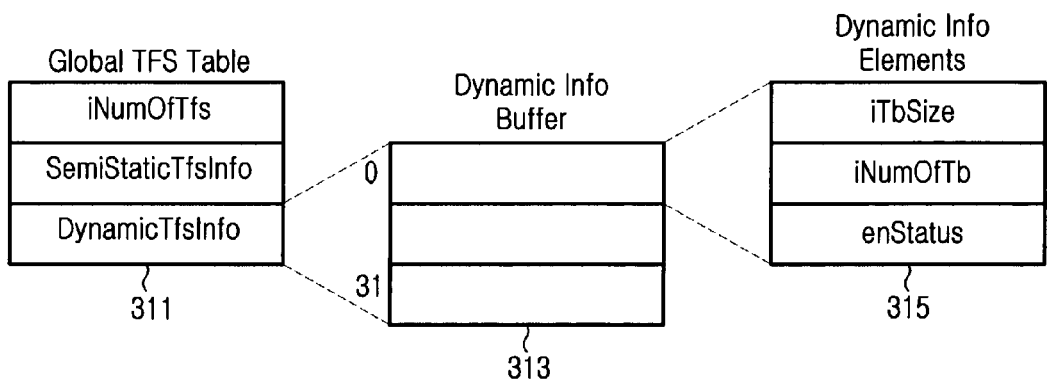
FIG. 3 schematically illustrates a structure of a conventional transport format set table.

FIG. 3 schematically illustrates a general transport format set table structure. Referring to FIG. 3, the transport format set table 311 contains information elements about a predetermined number of transport format sets. A parameter iNumOfTfs stored at the uppermost location of the transport format set table 311 represents the number of transport format sets that can be assigned to a certain transport channel. The information elements for each of the transport format sets contained in the transport format set table 311 include parameters SemiStaticTfsInfo and DynamicTfsInfo. From among the parameters contained in the transport format set information, the SemiStaticTfsInfo has no relation to the transport format selection method of the present invention and thus will not be described in detail here, but DynamicTfsInfo will be described herein below.

The parameter DynamicTfsInfo contains dynamic info elements pertaining to the transport channel, which are stored in a separate dynamic info buffer 313. In this case, since the maximum number of the transport format sets may be 32, the dynamic info buffer 313 has a structure capable of storing 32 dynamic info elements. Further, each of the dynamic info elements includes information elements of parameters iTbSize, iNumOfTb, and enStatus. The parameter iTbSize represents a transport block information size of a specific element stored in the dynamic info buffer, the parameter iNumOfTb represents the entire size of TBs of the specific element stored in the dynamic info buffer, and the parameter enStatus represents a status in which the TBs of the specific element stored in the dynamic info buffer are. In this case, the status of the TBs may be one of TF_ALLOWED, TF_NOT_ALLOWED, TF_RESTRICTED, TF_AVAILABLE, and TF_REMOVED.

The transport format set table structure described above is shown in the following Table 3.

In addition to the transport format table structure shown above, a Transport Format Combination Indicator (TFCI) table will be described hereinafter, with reference to FIG. 4.

Figure 4:
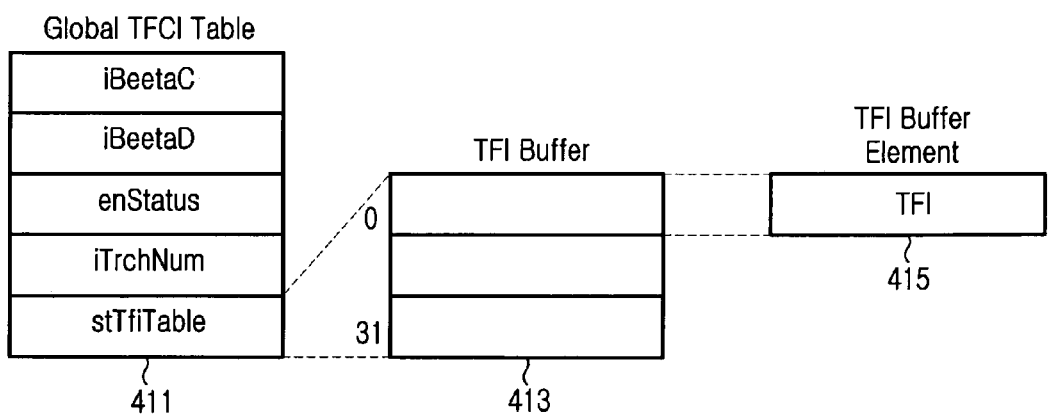
FIG. 4 schematically illustrates a structure of a conventional transport format set indicator table.

FIG. 4 schematically illustrates a structure of a general TFCI table. Referring to FIG. 4, the TFCI table 411 contains Transport Format Indicators (TFIs) and statuses of the TFIs. Information elements contained in the TFCI table include parameters iBeetaC, iBeetaD, enStatus, iTrchNum, and stTfiTable. Here, the parameters contained in the TFCI table 411 will be briefly described.

From among the above-listed parameters, the parameters iBeetaC and iBeetaD have no relation to the transport format selection method of the present invention and thus will not be described here in detail. The parameter enStatus represents a status of the transport format combinations, which represents whether the transport format combinations can presently be assigned. In this case, the status of the TBs may be one of TF_ALLOWED, TF_NOT_ALLOWED, TF_RESTRICTED, TF_AVAILABLE, and TF_REMOVED. The parameter iTrchNum represents the number of transport format indicators stored in a transport format indicator buffer 413, which will be described later. The parameter stTfiTable includes transport format combinations of the TFCI table 411. In this case, the transport format indicator buffer 413 comprises 32 transport format indicator elements 415 in total. Values of the transport format indicators are represented in iGlbTFISynType.

The structure of the TFCI table 411 described above is shown in Table 4 below.

TABLE 3

| SI. No. | PARAMETER DESCRIPTION | Description | DATA TYPE | VALUE | No. of Bytes |
|---|---|---|---|---|---|
| 1 | iNumOfTfs | Number of set of Transport Formats associated to a Transport Channel | Integer | | 4 |
| 2 | iSemiStaticTfsInfo | Semistatic Information pertaining to the Transport Channel (not needed for TF Selection procedure) | | | |
| 3 | >iTbSize | Dynamic Information pertaining to the Transport Channel | | | |
| | >iNumOfTb | Transport Block size of a particular element of dynamic info buffer | integer | | 4 |
| | >iNumOfTb | Total size of Transport Block on a particular element of dynamic info buffer | integer | | 4 |

TABLE 4

| Sl. No. | PARAMETER DESCRIPTION | Description | DATA TYPE | VALUE | No. of Bytes |
|---|---|---|---|---|---|
| 1 | iBeetaC | Variable unrelated to TF Selection | integer | | 4 |
| 2 | iBeetaD | Variable unrelated to TF Selection | integer | | 4 |
| 3 | enStatus | Status of the TFC, stating whether it is allowed | enum | TF_ALLOWED/ TF_NOT_ALLOWED/ TF_RESTRICTED/ TF_AVAILABLE/ TFC REMOVED | 1 |
| 4 | iTrchNum | Variable showing how many TFIs are stored in the array below | integer | | 4 |
| 5 | stTfiTable | Array containing the TFIs in the TFCI table | | | |
| | >iGlbTFISynType | Value of TFIs | integer | | 4 |

In addition to the TFCI table structure described above, a transport block information table (TB info table) will be described hereinafter, with reference to FIG. 5.

Figure 5:
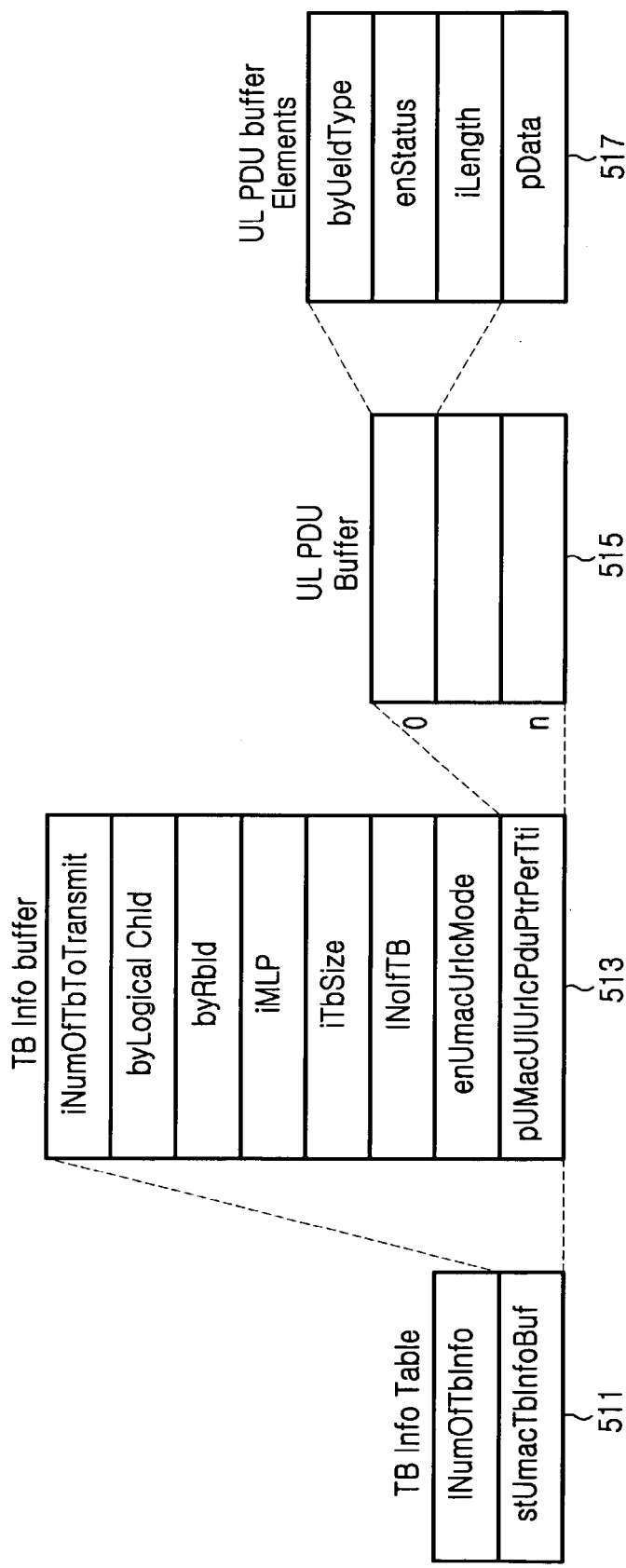
FIG. 5 schematically illustrates a structure of a conventional transport block information table.

FIG. 5 schematically illustrates a structure of a conventional TB information table. Referring to FIG. 5, the TB information table 511 is used in accessing a transport block table (TB table) commonly applied to all uplink transport channels. The TB information table 511 stores radio bearer multiplexing information for a certain transport channel and is used to select a transport format and TB information according to the present invention. The TB information table 511 includes parameters iNumOfTbInfo and stUmacTbInfoBuf, as illustrated in FIG. 5. The parameter iNumOfTbInfo represents the number of TB buffers stored in the TB information table 511. Further, parameter stUmacTbInfoBuf includes a TB information buffer 513 which includes parameters iNumOfTbToTransmit, byLogicalChId, byRbId, iMLP, iTbSize, iNoIfTB, enUmacRLCMode, and pUmacUlRLCPduPtrPerTti, as illustrated in FIG. 5.

Herein below, the parameters contained in the TB buffer 513 will be described.

The parameter iNumOfTbToTransmit represents the number of TBs that can be transmitted during a certain TTI. The parameter byLogicalChId represents a logical channel indicator mapped to the transport channel. The parameter byRbId represents a radio bearer indicator mapped to the transport channel. The parameter iMLP represents a priority of a logical channel of the MAC layer 115. The parameter iTbSize represents the transport block size, the parameter iNoIfTB represents the TBSS, the parameter enUmacRLCMode represents a current operation mode of the RLC layer 13, and the parameter pUmacUlRLCPduPtrPerTti includes uplink PDU buffers 515 for storing uplink PDUs transmitted during the TTI. Each of the uplink PDU buffers 515 includes uplink PDU buffer elements 517 having parameters byUeId, enStatus, iLength, and pData, respectively. The parameter byUeId represents a UE indicator (UE ID), the parameter enStatus represents a status of the transport format, the parameter iLength represents the length of transmitted data, and the parameter pData represents a pointer for the transmitted data. In this case, the status of the transport format represented by the parameter enStatus may be one of TF_ALLOWED, TF_NOT_ALLOWED, TF_RESTRICTED, and TF_AVAILABLE.

The structure of the TB information table described above is shown in Table 5 below.

TABLE 5

| Sl. No. | PARAMETER DESCRIPTION | Description | DATA TYPE | VALUE | No. of Bytes |
|---|---|---|---|---|---|
| 1 | iNumOfTb | Number of structures in the TB info Table | Integer | | 4 |
| 2 | stUmactbInfoBuf | TB information buffer for a particular TB size | | | |
| | >iNumOfTbToTransmit | Number of TBs to be transmitted in the TTI | Integer | | 4 |
| | >byLogicalChId | Logical Channel Id | Byte | | 1 |
| | >iMLP | Priority of the given Logical Channel | Integer | 1 to 8 | 4 |
| | >iTbSize | Transport block Size | Integer | | 4 |
| | >iNoIfTB | TBSS | Integer | | 4 |
| | >enUmacJRLCMode | RLC Mode | Enum | AM/TM/UM | 1 |
| | >pUmacUIRLCPduPtrPerTti | Information pertaining to the TB to be transmitted in a particular TTI | | | |
| | >>byUeId | User Equipment Id | Byte | | 1 |
| | >>enStatus | Status of the TF | Enum | TF_ALLOWED/ TF_NOTALLOWED/ TF_RESTRICTED/ TF_AVAILABLE | 1 |

TABLE 5-continued

| Sl. No. | PARAMETER DESCRIPTION | Description | DATA TYPE | VALUE | No. of Bytes |
|---|---|---|---|---|---|
| | >>iLength | Length of the data to be transmitted | Integer | | 4 |
| | >>pData | Pointer to the data to be transmitted | Pointer to byte | | 1 |

A subset table structure newly proposed in order to minimize searching time for transport format selection according to the present invention will be described with reference to FIG. 6.

Figure 6:
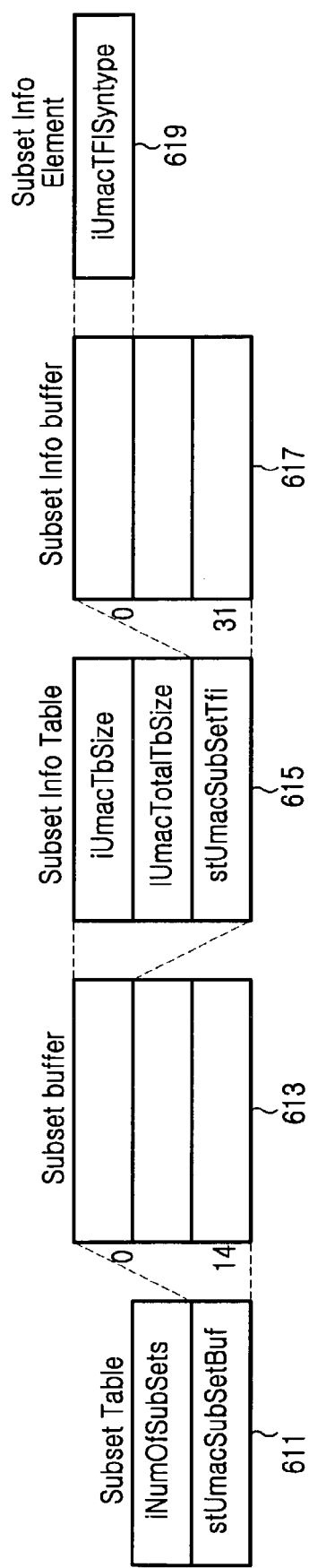
FIG. 6 schematically illustrates a subset table structure according to an embodiment of the present invention.

FIG. 6 schematically illustrates a subset table structure according to an embodiment of the present invention. Referring to FIG. 6, the subset table 611 has parameters iNumOfSubSets and stUmacSubSetBuf. The parameter iNumOfSubSets represents the number of the subsets having different transport block sizes. In the present embodiment, since it is assumed that the number of the subsets is 15, the parameter iNumOfSubSets has a value of 15. The parameter stUmacSubSetBuf has a structure including subset buffers 613, each of which has a structure of a subset info table 615. Each of the subset info tables 615 includes parameters iUmacTbSize, iUmacTotalTbSize, and stUmacSubSetTfi. The parameter iUmacTbSize represents a transport block size, the parameter iUmacTotalTbSize represents all the transport block sizes of a corresponding subset, and the parameter stUmacSubSetTfi represents a structure including subset info buffers 617. Each of the subset info buffers 617 includes a subset info element 619 having a parameter iUmacTFISyntype. The parameter iUmacTFISyntype represents a transport format indicator. In conclusion, the subset table 611 has a structure capable of classifying and storing the transport format indicators according to the transport block sizes.

The subset table structure described above is shown in Table 6 below.

TABLE 6

| Sl. No. | PARAMETER DESCRIPTION | Description | DATA TYPE | VALUE | No. of Bytes |
|---|---|---|---|---|---|
| 1 | iNumOfSubSets | The number of subsets in the table Having different TB Sizes | Integer | | 4 |
| 2 | stUmacSubSetBuf | Structure containing information on Each TB Size | | | |
| | >iNumOfTfi | Variable showing the number of TFs contained in this table | Integer | | 4 |
| | >iMacTotalTbSize | Total TBS Size of the subset | Integer | | 4 |
| | >stUmacSubSetTfi | Array of TFIs | | | |
| | >>iUmacTFISyntype | TFI | Integer | | 4 |

A temporary transport format indicator table (temp TFI table) structure will be described with reference to FIG. 7.

Figure 7:
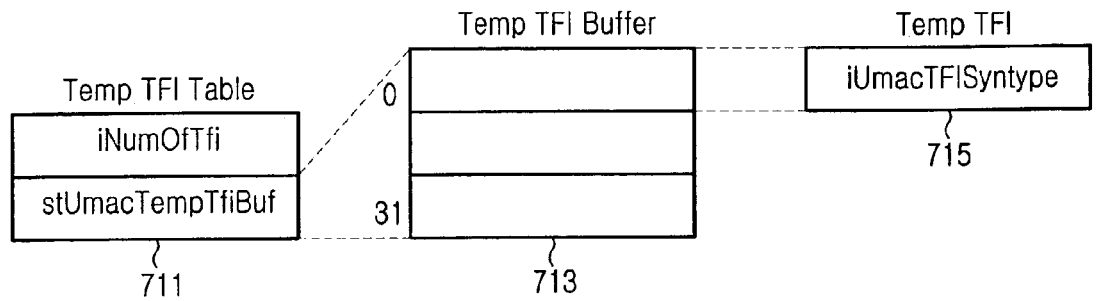
FIG. 7 schematically illustrates a temp TFI table structure according to an embodiment of the present invention.

FIG. 7 schematically illustrates a temp TFI table structure according to an embodiment of the present invention. The temporary transport format indicator table 711 includes information about the transport format indicators contained in the parameter stUmacSubSetBuf described with reference to FIG. 6. Referring to FIG. 7, the temporary transport format indicator table 711 includes parameters iNumOfTfi and stUmacTempTfiBuf. The parameter iNumOfTfi represents the number of transport format indicators stored in the temporary transport format indicator table 711. The parameter stUmacTempTfiBUf includes temporary transport format indicator buffers (temp TFI buffers) 713. Each of the temp TFI buffers 713 includes a temporary transport format indicator (temp TFI) 715 for the corresponding transport format indicator. The temp TFI 715 has a parameter iUmacTFISyntype, which represents a corresponding transport format indicator.

The temp TFI table structure described above is shown in Table 7 below.

TABLE 7

| Sl. No. | PARAMETER DESCRIPTION | Description | DATA TYPE | VALUE | No. of Bytes |
|---|---|---|---|---|---|
| 1 | iNumOfTf | Number of TFIs in the table | integer | | 4 |
| 2 | stUmacTempTfiBUf >iMacTFISyntype | Array of TFIs TFI | integer | 0 to 31 | 4 |

Figure 8:
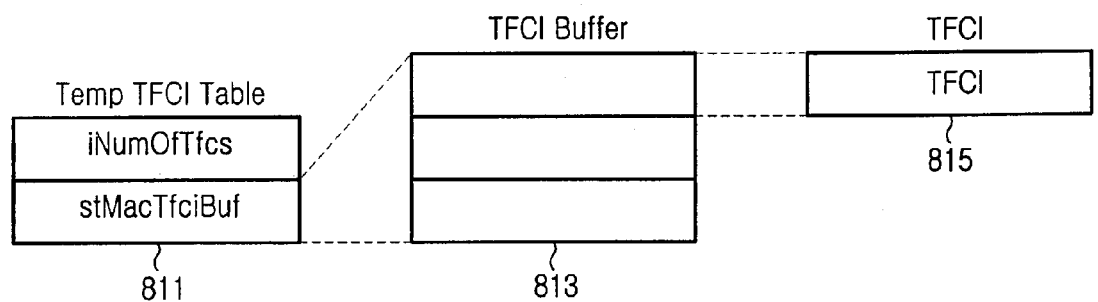
FIG. 8 schematically illustrates a temp TFCI table structure according to another embodiment of the present invention.

FIG. 8 schematically illustrates a temp TFCI table structure according to another embodiment of the present invention. Referring to FIG. 8, the temporary transport format combination indicator table 811 is generated by the MAC layer 115, to store the transport format combination indicators, and includes parameters iNumOfTfcs and stUmacTfciBuf. The parameter iNumOfTfcs represents the number of the transport format combination indicators stored in the temp TFCI table 811, and the parameter stUmacTfciBuf includes transport format combination indicator buffers 813. Each of the transport format combination indicator buffers 813 stores a corresponding transport format combination indicator 815.

The temp TFCI table structure described above is shown in Table 8 below.

TABLE 8

| Sl. No. | PARAMETER DESCRIPTION | Description | DATA TYPE | VALUE | No. of Bytes |
|---|---|---|---|---|---|
| 1 | INumOfTfcs | Number of TFCIs in the table | integer | | 4 |
| 2 | StUmacTfciBuf >iUmacTfciIdxSynType | Array of TFCIs TFCI | integer | | 4 |

Figure 9:
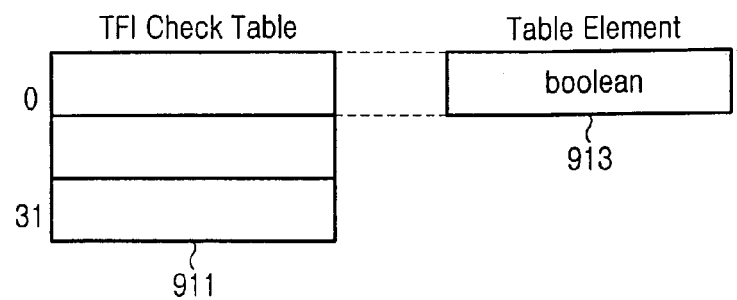
FIG. 9 schematically illustrates a TFI check table structure according to another embodiment of the present invention.

FIG. 9 schematically illustrates a TFI check table structure according to another embodiment of the present invention. Referring to FIG. 9, the transport format indicator check table 911 is a table necessary to check what transport format indicator exists in the temporary transport format indicator table 711. The transport format indicator check table 911 contains logical value (Boolean elements) 913 expressed by the transport format indicators. Each logical value in the transport format indicator check table 911 is initially set as "false", and is converted into "true" when a specific transport format indicator is stored in the corresponding element of the temporary transport format indicator table 711. In other words, the transport format indicator check table 911 is a table for checking if a predetermined transport format indicator exists in the transport format indicator table. When the logical value corresponding to the specific transport format indicator is "true", it indicates that the specific transport format indicator exists in the transport format indicator table.

The TFI check table structure described above is shown in Table 9 below.

TABLE 9

| Sl. No. | PARAMETER DESCRIPTION | Description | DATA TYPE | VALUE | No. of Bytes |
|---|---|---|---|---|---|
| 1 | stUmactempTficheckType | Array containing the booleans which are used to check for the presence of a particular TFI in the TF Table | | | |
| | >Boolean | Element of the array | Boolean | True/False | 1 |

Next, a method of selecting a transport format according to an embodiment of the present invention will be briefly described herein below.

First, the RRC layer 111 controls scheduling of uplink data by assigning priorities from 1 to 8 to each of the logical channels. In this case, as described above, from among the priority values assigned to the logical channels, '1' is a value having the highest priority and '8' is a value having the lowest priority. The selection of TFCs in the UE depends on the priorities assigned to the logical channels by the RRC layer 111, and the determined priorities for the logical channels are absolute. Therefore, the UE transmits service data having a higher priority through a logical channel having a higher priority, thereby optimizing data transmission rate and maintaining the service quality.

During the data transmission as described above, selection of a transport format combination for a corresponding transport channel is performed whenever the selection of a transport format combination is started, that is, at every initial point of TTIs. The following description is given of a case where selection of a transport format combination is performed in consideration of the priority values N1, . . . , N2 (N2>N1), when there is data to be transmitted at an initial point of a TTI, which means a point of time when the selection of a transport format combination is started. In the following description, S1 and S2 represent transport format combination sets.

Hereinafter, the process of selecting a transport format combination will be briefly described.

(1) In consideration of the maximum UE transmit power that can currently be supported, a set of all transport format combinations pertaining to a transport format combination set capable of supporting the maximum UE transmit power is set as S2.

(2) The priority N of a corresponding logical channel is set as N1 (N=N1).

(3) S1 is substituted by S2 (S1=S2).

(4) When S1 includes only one transport format combination, this transport format combination is selected and the process is ended.

(5) A set of all transport format combinations pertaining to S1 in consideration of the maximum UE transmit power, each of which has available data bits whose priority is N, is set as S2.

(6) The priority N is substituted by a value obtained by adding 1 to the previous priority (N=N+1).

(7) If N>N2, one transport format combination is selected from the transport format combinations of S2, and then the process is ended.

(8) After the above steps, the process returns to step 3.

As described above, a rule by which the UE selects a transport format combination is applied to the dedicated channel from among the transport channel. The transport format combination selection rule may be employed in transport format selection for a random access channel and a common packet channel (CPCH). When the UE transmit power approaches the maximum transmit power of the UE and the internal loop for power control cannot be maintained any more due to the coverage problem, the UE is adapted to a transport format combination corresponding to the next highest bit. That is, the UE controls the transport format combination having the current bit rate not to be used. Further, when a bit rate of a logical channel, which transfers data from a CODEC supporting the variable rate operation, conflicts with the lower bit rate, the bit rate of the CODEC is changed in order to avoid the confliction, so that CODEC data rate is properly selected. Further, the UE continuously measures whether the maximum transmit power of the UE can support the temporarily interrupted transport format combination. When the maximum transmit power of the UE is acceptable, the temporarily interrupted transport format combination is reconsidered when selecting a transport format combination.

FIGS. 10A to 10F are flowcharts illustrating a process of selecting a transport format combination according to another embodiment of the present invention.

Figure 10A:
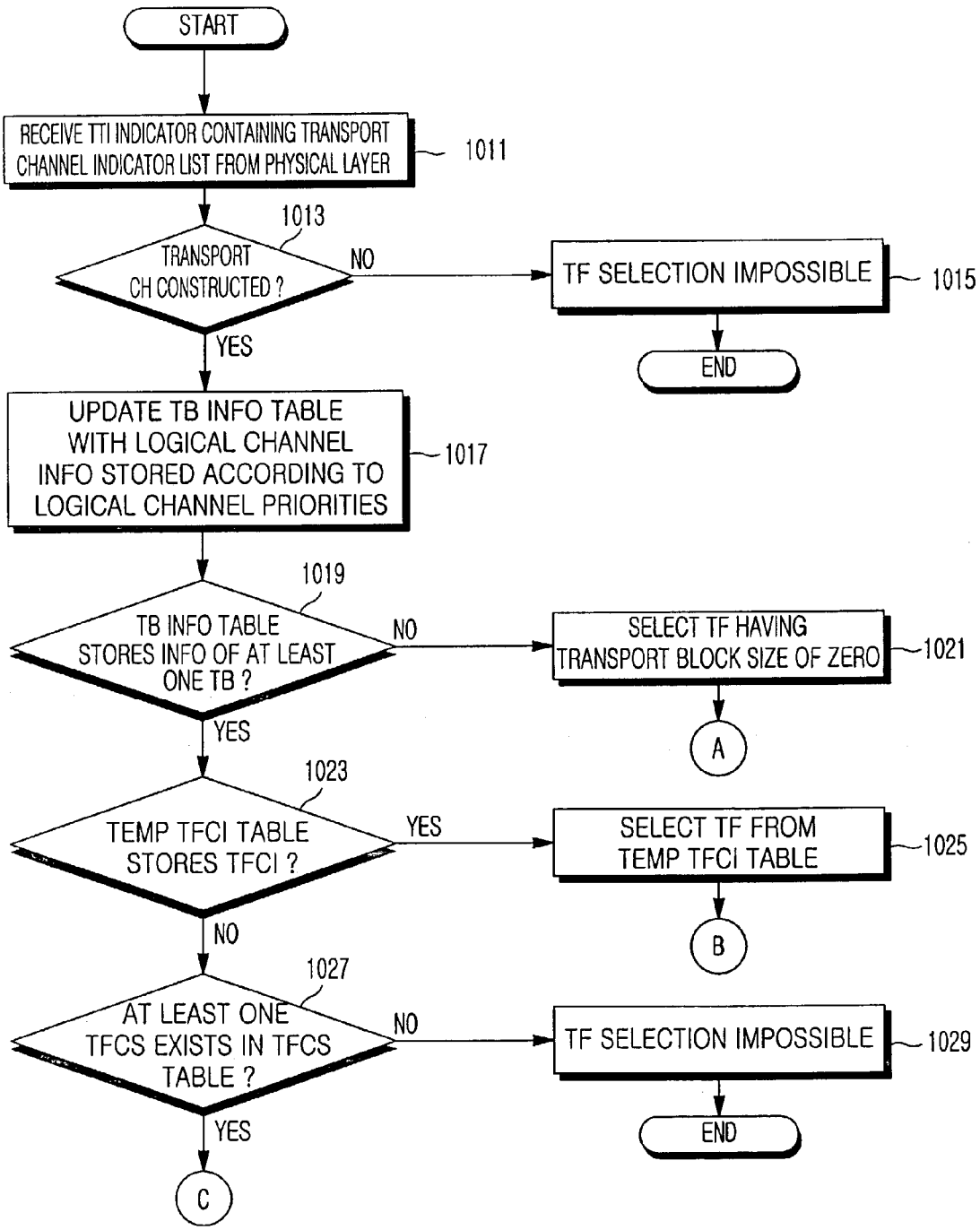
FIGS. 10A to 10F are flowcharts illustrating a process of selecting a transport format combination according to another embodiment of the present invention.

First, referring to FIG. 10A, the MAC layer 115 receives a TTI indicator containing a list of transport channel indicators from the physical layer 117 in step 1011. In this case, the TTI indicator operates as a trigger by which the MAC layer 115 starts the transport format selection and obtains data from the higher layer. In step 1013, the MAC layer 115 determines if a corresponding transport channel has been constructed. When a corresponding transport channel has not been constructed, the MAC layer 115 proceeds to step 1015. In step 1015, since it is impossible to progress the transport channel selection any more without any constructed transport channel, the MAC layer brings the progress to an error and ends the process. However, when the corresponding transport channel has been constructed, the MAC layer 115 proceeds to step 1017. In step 1017, the MAC layer 115 updates the TB info table 511 with information from the logical channels which have already been classified according to logical channel priorities (MLP), and then proceeds to step 1019. In this case, the information undated in the TB info table 511 includes uplink PDUs, logical channel indicators, RLC layer modes, radio bearer indicators, logical channel priorities, transport block sizes, TBSSs, MAC header sizes, and the number of TB info elements.

In step 1019, the MAC layer 115 determines if the TB info table 511 contains information about one or more TBs, e.g., the MAC layer 115 determines if a logical channel has data to be transmitted, that is, a PDU (PDU). In this case, all the logical channels need not always have data to be transmitted. When there is no PDU to be transmitted, the MAC layer 115 selects a transport format having a transport block size of '0' or continuously searches the transport format combination indicator table 411. When the TB info table 511 contains no information about the TBs, the MAC layer 115 proceeds to step 1021. In step 1021, the MAC layer 115 selects a transport format having a transport block size of '0' and then proceeds to step 1211 illustrated in FIG. 10C. In step 1211, the MAC layer 115 selects the first element of the transport format combination indicator table 411, that is, the first transport format combination indicator, and proceeds to step 1213. In step 1213, the MAC layer 115 determines if all elements of the transport format combination indicator table 411 are being processed. When all elements of the transport format combination indicator table 411 are being processed, the MAC layer 115 proceeds to step 1215.

In step 1215, the MAC layer 115 determines if a transport format indicator having no TB exists. When a transport format indicator having no TB exists, the MAC layer 115 proceeds to step 1217. In step 1217, the MAC layer 115 selects the transport format indicator as the transport format and ends the transport format selection process. However, when a transport format indicator having no TB does not exist, the MAC layer 115 proceeds to step 1216. In step 1216, since the transport format selection is impossible, the MAC layer 115 brings the progress to an error and returns to the initial stage of the process.

In step 1213, when all elements of the transport format combination indicator table 411 are not being processed, the MAC layer 115 proceeds to step 1219. In step 1219, the MAC layer 115 determines the element of the transport format combination indicator table 411 is an assignable element, and a dynamic element in the transport format set table 311, which corresponds to a given transport channel indicator, is assignable. In other words, step 1219 is a step in which the MAC layer 115 determines whether a transport format combination indicator selected from the transport format combination indicator table 411 is assignable, and whether a transport format indicator for a transport channel indicator of the selected transport format combination indicator is assignable. Therefore, the MAC layer 115 determines the transport format combination indicator status of the transport format combination indicator table 411 and the transport channel status of the transport format table. If both the transport format combination indicator status and the transport channel status are "true", the MAC layer 115 selects the transport format indicator and updates the temporary transport format indicator table 711 with the selected transport format indicator. When the element of the transport format combination indicator table 411 is not assignable and the dynamic element in the transport format set table 311 corresponding to the given transport channel indicator is not assignable, the MAC layer 115 proceeds to step 1221. In step 1221, the MAC layer 115 moves to the next element of a transport format combination set table and then returns to step 1213.

In step 1219, when the element of the transport format combination indicator table 411 is assignable and the dynamic element in the transport format set table 311 corresponding to the given transport channel indicator is assignable, the process goes to step 1223. In step 1223, the MAC layer 115 determines if all logical channels in the transport channel table are being processed. When all logical channels in the transport channel table are being processed, the MAC layer 115 proceeds to step 1221. When all logical channels in the transport channel table are not being processed, the MAC layer 115 proceeds to step 1225. In step 1225, the MAC layer 115 determines if the number of TBs in a dynamic info part of the transport format set table 311 corresponding to the corresponding transport channel indicator is zero. When no TB is in the dynamic info part of the transport format set table 311 corresponding to the corresponding transport channel indicator, the MAC layer 115 proceeds to step 1221.

In contrast, in step 1225, when the number of TBs in a dynamic info part of the transport format set table 311 corresponding to the corresponding transport channel indicator is not zero, the MAC layer 115 proceeds to step 1227. In step 1227, the MAC layer 115 determines if the sum of the PDU size and the MAC header size of the transport channel table is equal to the TB size in the dynamic info part of the transport format set table 311 corresponding to the transport channel. When the sum of the PDU size and the MAC header size of the transport channel table is equal to the transport block size in the dynamic info part of the transport format set table 311 corresponding to the transport channel, the MAC layer 115 proceeds to step 1229. In step 1229, the MAC layer 115 updates the transport format indicator index into the current transport format indicator index and proceeds to step 1221. When the sum of the PDU size and the MAC header size of the transport channel table is not equal to the transport block size in the dynamic info part of the transport format set table 311 corresponding to the transport channel, the MAC layer 115 proceeds to step 1231. In step 1231, the MAC layer 115 moves to the next element of the logical channel buffer 119 and returns to step 1223.

As a result of step 1019, illustrated in FIG. 10A, when the TB info table 511 contains information about one or more TBs, that is, when the TB info table 511 has information about the TBs, the MAC layer 115 proceeds to step 1023. In step 1023, the MAC layer 115 determines if the temporary transport format combination indicator table 811 has a transport format combination indicator. In this case, the temporary transport format combination indicator table 811 will be generated in accordance with the first transport channel indicator. The temporary transport format combination indicator table 811 is a subset of the transport format combination set table. For the first transport channel indicator, the MAC layer 115 selects an available transport format combination indicator from the transport format combination set table and updates the temporary transport format combination indicator table 811 with the selected transport format combination indicator. Further, for the second transport channel indicator, the MAC layer 115 selects an available transport format combination indicator by means of the temporary transport format combination indicator table 811, that is, by utilizing whether the temporary transport format combination indicator table 811 has been generated. As a result of the checking in step 1023, when the temporary transport format combination indicator table 811 has a transport format combination indicator, the MAC layer 115 proceeds to step 1025. In step 1025, the MAC layer 115 selects a transport format from the temporary transport format combination indicator table 811 and then proceeds to step 1311, illustrated in FIG. 10D.

In step 1311, the MAC layer 115 selects the first element of the temporary transport format combination indicator table 811. In step 1313, the MAC layer 115 determines if the first element of the temporary transport format combination indicator table 811 is assignable, and a dynamic element in the transport format set table 311, which corresponds to the transport channel, is assignable. When the first element of the temporary transport format combination indicator table 811 is not assignable and a dynamic element in the transport format set table 311 corresponding to the transport channel is not assignable, the MAC layer 115 proceeds to step 1315. In step 1315, the MAC layer 115 moves to the next element of the temporary transport format combination indicator table 811 and then proceeds to step 1317. In step 1317, the MAC layer 115 determines if it has reached the last element of the temporary transport format combination indicator table 811. As a result of the checking, when the MAC layer 115 has not reached the last element of the temporary transport format combination indicator table 811 yet, the MAC layer 115 returns to step 1313. In contrast, as a result of the checking, when the MAC layer 115 has reached the last element of the temporary transport format combination indicator table 811, the MAC layer 115 proceeds to step 1319. In step 1319, the MAC layer 115 determines if any element is stored in the temporary transport format indicator table 711. When at least one element is stored in the temporary transport format indicator table 711, the MAC layer 115 proceeds to step 1411, illustrated in FIG. 10E. In step 1319, when no element is stored in the temporary transport format indicator table 711, the MAC layer 115 proceeds to step 1329. In step 1329, the MAC layer 115 brings the progress to an error and ends the process.

In step 1313, when the first element of the temporary transport format combination indicator table 811 is assignable and a dynamic element in the transport format set table 311 corresponding to the transport channel is assignable, the MAC layer 115 proceeds to step 1321. In step 1321, the MAC layer 115 determines if the logical value of the transport format indicator is set as "true" in the transport format indicator check table 911. When the logical value of the transport format indicator is set as "true" in the transport format indicator check table 911, the MAC layer 115 proceeds to step 1315. However, when the logical value of the transport format indicator is not set as "true", which means the logical value of the transport format indicator is set as "false" in the transport format indicator check table 911, the MAC layer 115 proceeds to step 1323. In step 1323, the MAC layer 115 inputs the transport format indicator into the temporary transport format indicator table 711 and proceeds to step 1325. In step 1325, the MAC layer 115 sets the logical value of the transport format indicator as "true" in the transport format indicator check table 911 and proceeds to step 1327. In step 1327, the MAC layer 115 determines if it has reached the last element of the temporary transport format indicator table 711, which means the MAC layer 115 determines if the 32 transport format indicators in the temporary transport format indicator table 711 have been updated. When the 32 transport format indicators in the temporary transport format indicator table 711 have been updated, a transport format indicator corresponding to the PDUs is selected. When the MAC layer 115 has not reached the last element of the temporary transport format indicator table 711 yet, the MAC layer 115 proceeds to step 1315. In contrast, when the MAC layer 115 has reached the last element of the temporary transport format indicator table 711, the MAC layer 115 proceeds to step 1411.

Figure 10B:
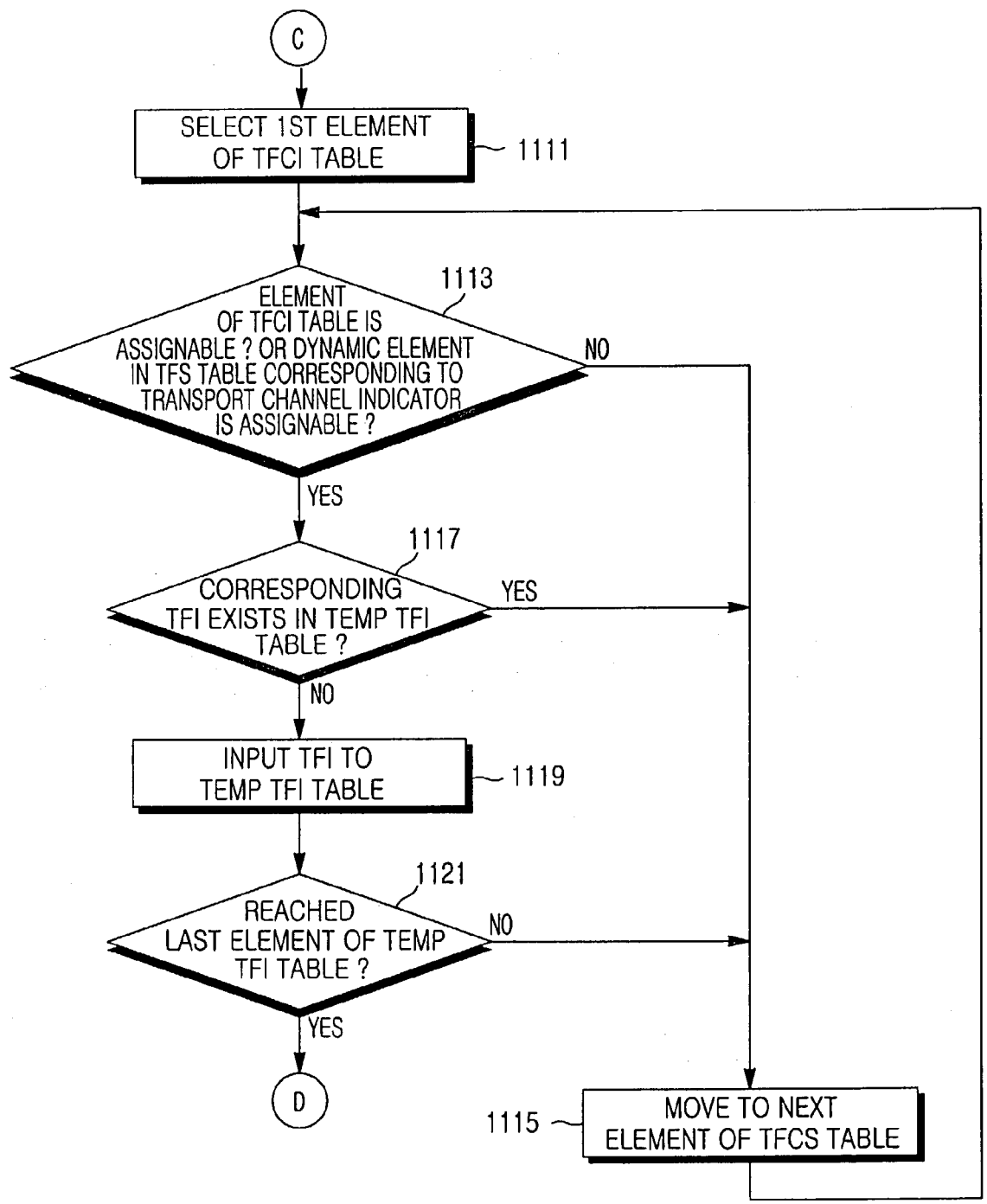
Figure 10C:
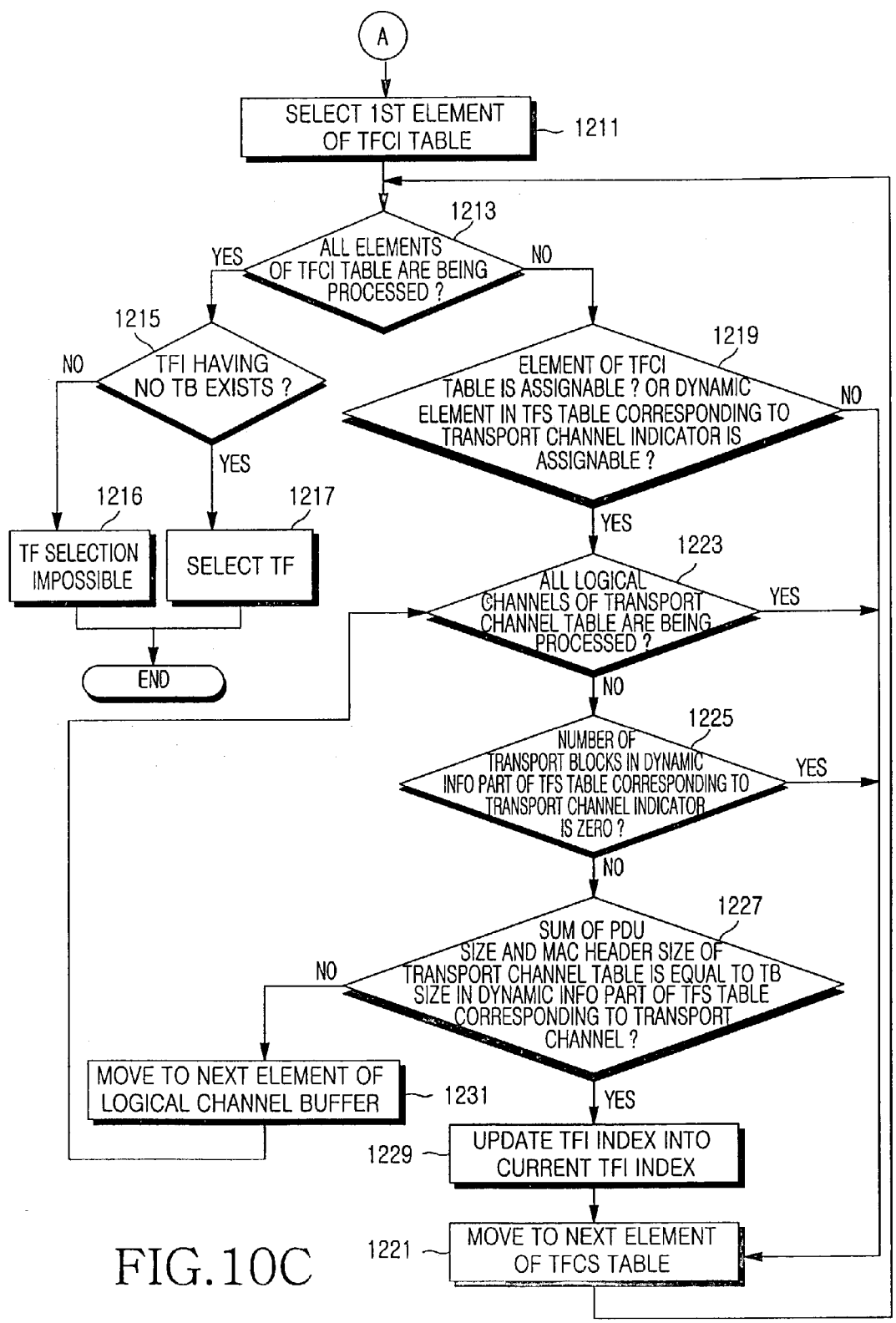
Figure 10D:
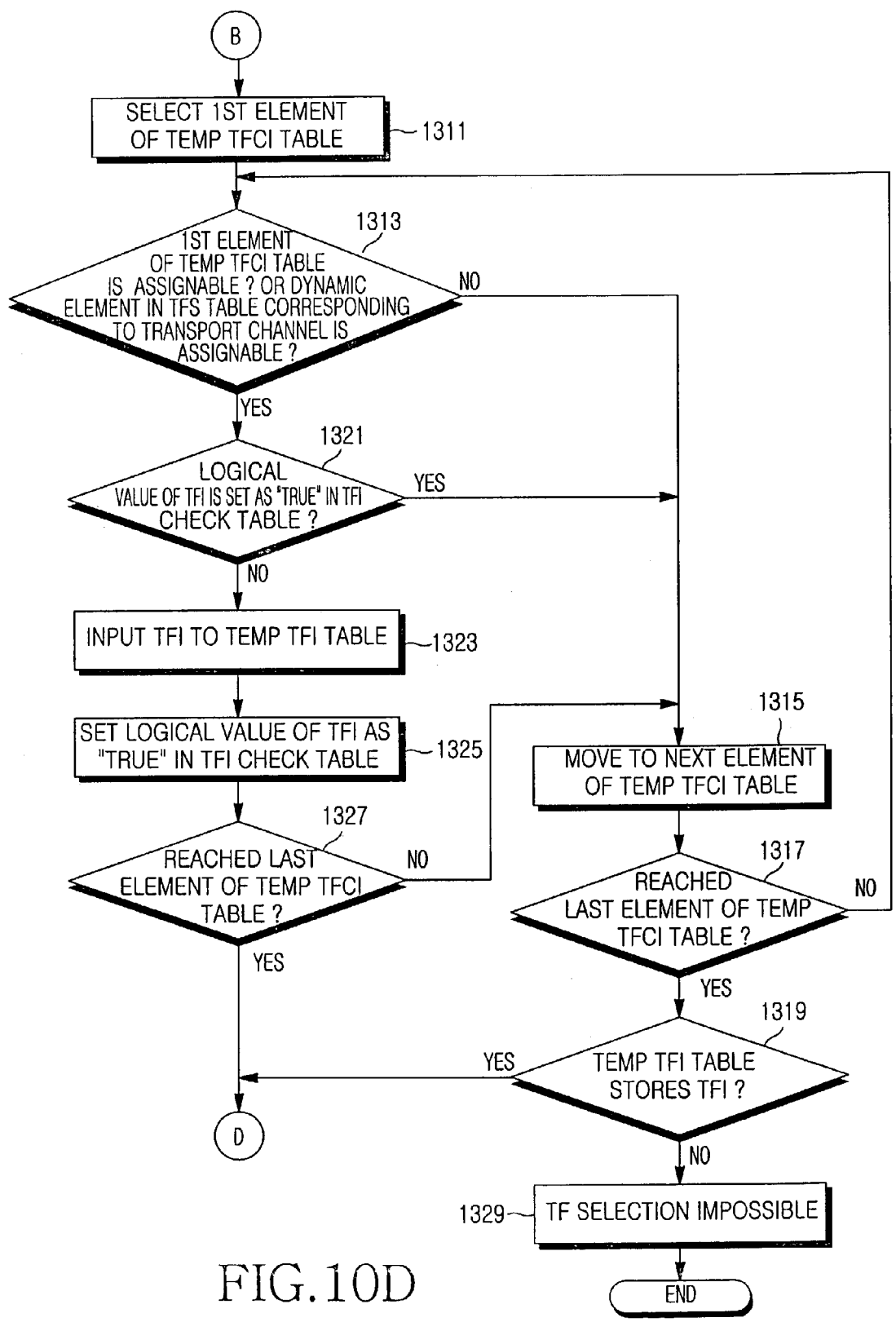
Figure 10E:
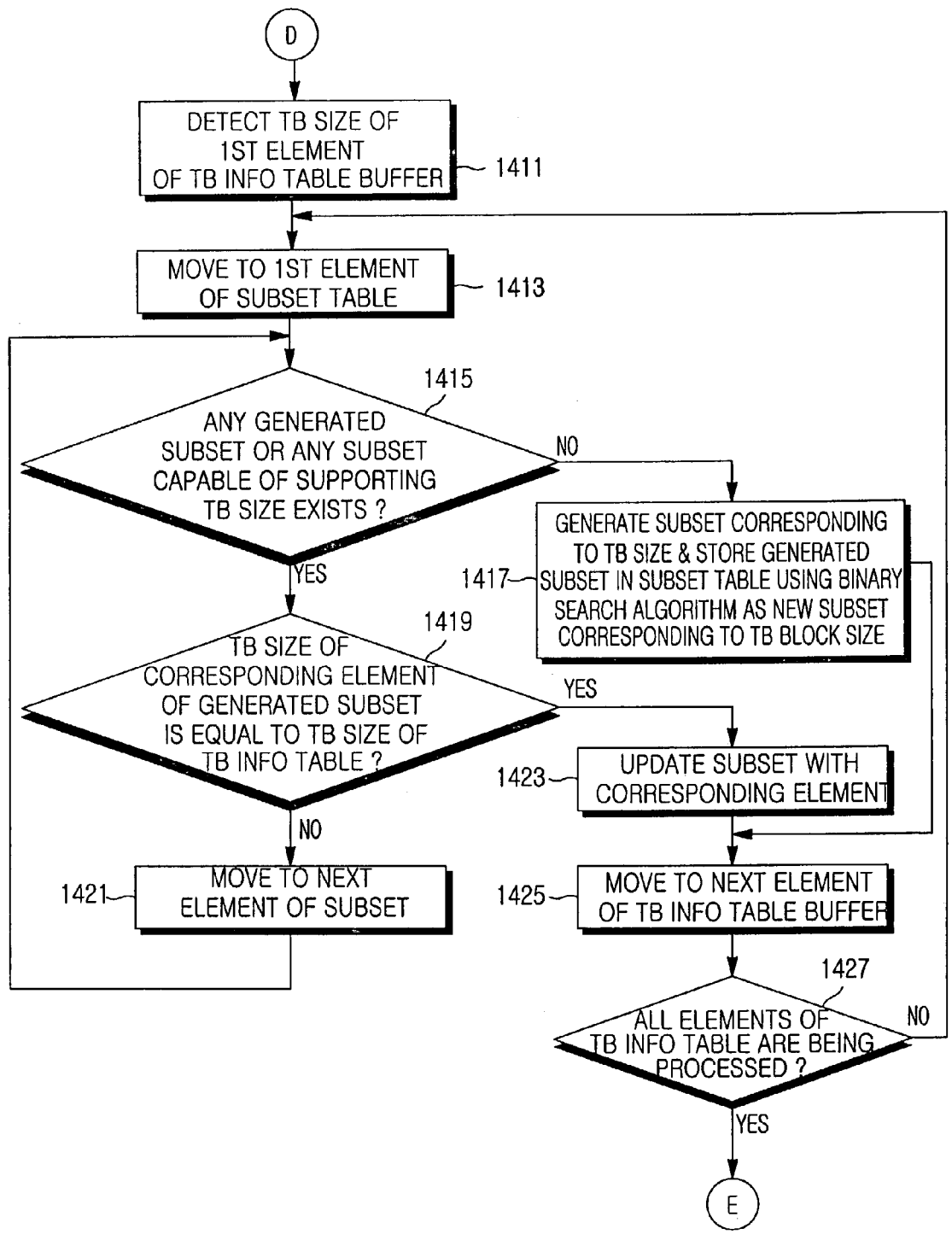

In step 1023, when the temporary transport format combination indicator table 811 has no transport format combination indicator, the MAC layer 115 proceeds to step 1027. In step 1027, the MAC layer 115 determines if one or more transport format combinations exist in the transport format combination set table. When no transport format combination set exists in the transport format combination set table, the MAC layer 115 proceeds to step 1029. In step 1029, since it is impossible to progress the transport channel selection any more, the MAC layer 115 brings the progress to an error and ends the process. In contrast, when at least one transport format combination set exists in the transport format combination set table, the MAC layer 115 proceeds to step 1111 as illustrated in FIG. 10B.

In step 1111, the MAC layer 115 selects the first element of the temporary transport format combination indicator table 811 and then proceeds to step 1113. In step 1113, the MAC layer 115 determines if the first element of the temporary transport format combination indicator table 811 is assignable, and a dynamic element in the transport format set table 311, which corresponds to the transport channel indicator, is assignable. In this case, an object of step 1113 is to determine if a transport format combination indicator selected from the transport format combination indicator table is assignable and if a corresponding transport format indicator of the transport channel indicator in the assigned transport format combination indicator is assignable. In this case, two tables are checked, which include a transport format combination indicator table for examining the transport format combination indicator status and a transport format table for examination of the status of the selected transport channel. When both of the transport format combination indicator status and the selected transport channel status are "true", a transport format is selected, and the temporary transport format combination indicator table 811 is updated with the selected transport format. In this case, the temporary transport format combination indicator table 811 is a temporary table used during the transport format selection and is cleared after a transport format is selected. In step 1113, when the corresponding element of the temporary transport format combination indicator table 811 is not assignable and a dynamic element in the transport format set table 311 corresponding to the transport channel indicator is not assignable, the MAC layer 115 proceeds to step 1115.

In step 1115, the MAC layer 115 moves to the next element of the transport format combination set table and returns to step 1113.

In step 1113, when the corresponding element of the temporary transport format combination indicator table 811 is assignable and a dynamic element in the transport format set table 311 corresponding to the transport channel indicator is assignable, the MAC layer 115 proceeds to step 1117. In step 1117, the MAC layer 115 determines if the corresponding transport format indicator already exists in the temporary transport format indicator table 711. When the corresponding transport format indicator already exists in the temporary transport format indicator table 711, the MAC layer 115 proceeds to step 1115. When the corresponding transport format indicator does not exist in the temporary transport format indicator table 711, the MAC layer 115 proceeds to step 1119. In step 1119, the MAC layer 115 inputs the transport format indicator into the temporary transport format indicator table 711 and proceeds to step 1121. In step 1121, the MAC layer 115 determines if it has reached the last element of the temporary transport format indicator table 711, which means, the MAC layer 115 determines if the number of the transport format indicators having been updated in the temporary transport format indicator table 711 is smaller than 32. When the MAC layer 115 has not reached the last element of the temporary transport format indicator table 711 yet, the MAC layer 115 proceeds to step 1115. However, when the MAC layer 115 has reached the last element of the temporary transport format indicator table 711, the MAC layer 115 proceeds to step 1411.

In step 1411, the MAC layer 115 detects a transport block size of the first element of the TB information buffer 513 and proceeds to step 1413. In step 1413, the MAC layer 115 moves to the first element of the subset table 611 and then proceeds to step 1415. In this case, subsets are generated for all transport block sizes in the subset table 611, and each of the subsets has a transport block size and a list of transport format indicators matching the transport block size. In step 1415, the MAC layer 115 determines if there are any generated subsets or any subsets capable of supporting the transport block size. When there is neither a generated subset nor a subset capable of supporting the transport block size, the MAC layer 115 proceeds to step 1417. In step 1417, the MAC layer 115 generates a subset corresponding to the transport block size, stores the generated subset in the subset table 611 using a binary search algorithm as a new subset corresponding to the transport block size, and then proceeds to step 1425.

In step 1415, when there is a generated subset or a subset capable of supporting the transport block size, the MAC layer 115 proceeds to step 1419. In step 1419, the MAC layer 115 determines if the transport block size of the current element of the subset is equal to the transport block size of the TB information table 511. When the transport block size of the current element of the subset is not equal to the transport block size of the TB information table 511, the MAC layer 115 proceeds to step 1421. In step 1421, the MAC layer 115 moves to the next element of the subset and then returns to step 1415.

In step 1419, when the transport block size of the current element of the subset is equal to the transport block size of the TB information table 511, the MAC layer 115 proceeds to step 1423. In step 1423, the MAC layer 115 updates the subset with the corresponding element and proceeds to step 1425. In step 1425, the MAC layer 115 moves to the next element of the TB information buffer 513 and proceeds to step 1427. In step 1427, the MAC layer 115 determines if all elements of the TB information table 511 are being processed. When all elements of the TB information table 511 are being processed, the MAC layer 115 proceeds to step 1511. When all the elements are not being processed, the MAC layer 115 proceeds to step 1413.

Figure 10F:
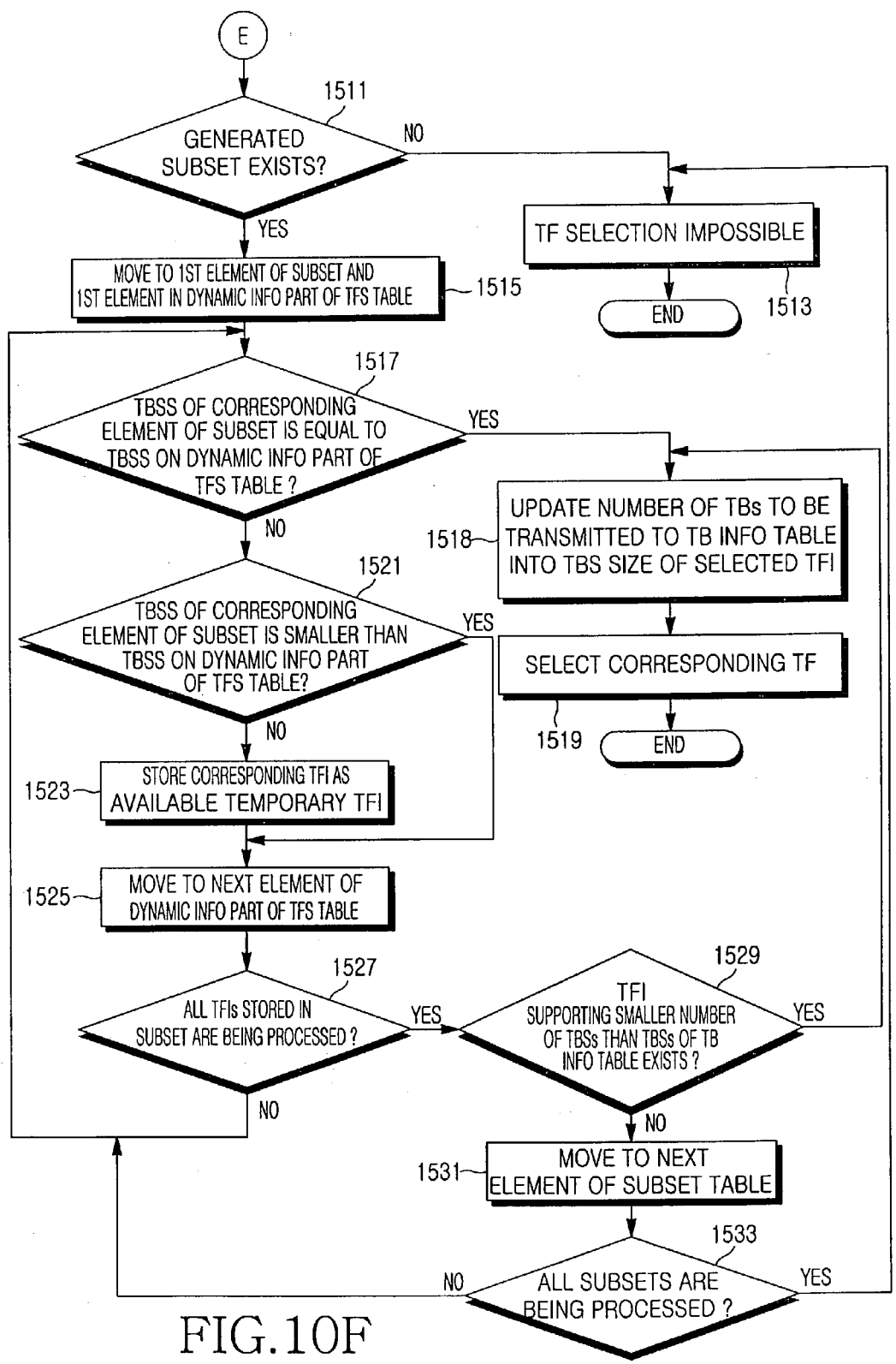

In step 1511, illustrated in FIG. 10*f*, the MAC layer 115 determines if there is a generated subset. As a result of the checking, when there exists no generated subset, the MAC layer 115 proceeds to step 1513. In step 1513, since it is impossible to progress the transport channel selection any more, the MAC layer brings the progress to an error and returns to the initial stage. When there is a generated subset, the MAC layer 115 proceeds to step 1515. In step 1515, the MAC layer 115 moves to the first element of the subset and the first element in the dynamic info part of the transport format set table 311, and then proceeds to step 1517. In step 1517, the MAC layer 115 determines if the TBSS of the corresponding element of the subset is equal to the TBSS on the dynamic info part of the transport format set table 311. In this case, when the generated subset exists, the number of the TBs supporting the transport format indicator selected from the subset should be compared with the number of the TBs estimated for the transport block size. In this case, the fact that the numbers of the TBs are equal to each other indicates that any transport format indicator can support the transport block size and the number of the TBs. Therefore, the MAC layer updates the TB information table with the number of TBs to be transmitted, for the selected transport block size. In step 1517, when the TBSS of the corresponding element of the subset is equal to the TBSS on the dynamic info part of the transport format set table 311, the MAC layer 115 proceeds to step 1518. In step 1518, the MAC layer 115 updates the number of the TBs to be transmitted to the TB information table 511 into the TBSS of the selected transport format indicator and proceeds to step 1519. In step 1519, the MAC layer 115 selects a corresponding transport format and ends the process.

Alternatively, in step 1517, when the TBSS of the corresponding element of the subset is not equal to the TBSS on the dynamic info part of the transport format set table 311, the MAC layer 115 proceeds to step 1521. In step 1521, the MAC layer 115 determines if the TBSS of the corresponding element of the subset is smaller than the TBSS on the dynamic info part of the transport format set table 311. In this case, when the MAC layer 115 has determined that the number of TBs estimated for the subset is not equal to the number of the TBs supported by the transport format indicator, the MAC layer 115 stores the transport format indicator and identifies other transport format indicators in the subset in step 1525 described below. When the TBSS of the corresponding element of the subset is smaller than the TBSS on the dynamic info part of the transport format set table 311, the MAC layer 115 proceeds to step 1523. In step 1523, the MAC layer 115 temporarily stores the corresponding transport format indicator as an available temporary transport format indicator and proceeds to step 1525. In step 1525, the MAC layer 115 moves to the next element of the dynamic info part of the transport format set table 311 and then proceeds to step 1527. In step 1527, the MAC layer 115 determines if all transport format indicators stored in the subset are being processed. When all the transport format indicators stored in the subset are not being processed, the MAC layer 115 returns to step 1517.

In contrast, in step 1527, when all the transport format indicators stored in the subset are being processed, the MAC layer 115 proceeds to step 1529. In step 1529, the MAC layer 115 determines if there is a transport format indicator supporting at least a smaller number of TBSs than the TBSs of the TB information table 511 (that is, if a transport format indicator has been stored in the temporary transport format indicator table 711). In this case, when the number of TBs in any transport format indicator approaches the number of TBs estimated in the subset, the MAC layer 115 updates the number of transmittable TBs of the TB information table 511. Otherwise, the MAC layer 115 should continuously check other subsets. As a result of the checking in step 1529, when there exists a transport format indicator supporting at least a smaller number of TBSs than the TBSs of the TB information table 511, the MAC layer 115 proceeds to step 1518. Therefore, in step 1529, when there is no transport format indicator supporting at least a smaller number of TBSs than the TBSs of the TB information table 511, the MAC layer 115 proceeds to step 1531. In step 1531, the MAC layer 115 moves to the next element of the subset table 611 and then proceeds to step 1533. In step 1533, the MAC layer 115 determines if all subsets are being processed. When all subsets are not being processed, the MAC layer 115 returns to step 1517. When all subsets are being processed, the MAC layer 115 returns to step 1513.

Figure 11:
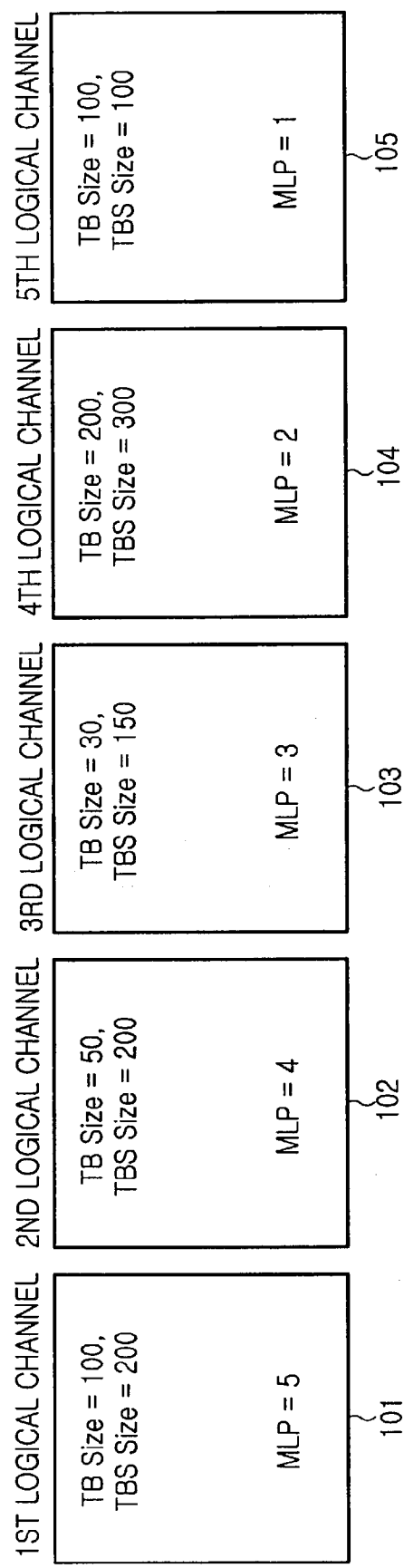
FIG. 11 schematically illustrates a plurality of transport channels multiplexed in one transport channel according to another embodiment of the present invention.

FIG. 11 schematically illustrates a plurality of transport channels multiplexed in one transport channel according to another embodiment of the present invention. Referring to FIG. 11, it is assumed that five logical channels, that is, a first logical channel 101, a second logical channel 102, a third logical channel 103, a fourth logical channel 104, and a fifth logical channel 105 are multiplexed in one transport channel. The first logical channel 101 has a transport block size of 100 (TB Size=100), a TBSS of 200 (TBS Size=200), and a logical channel priority of 5 (MLP=5). The second logical channel 102 has a transport block size of 50 (TB Size=50), a TBSS of 200 (TBS Size=200), and a logical channel priority of 4 (MLP=4). The third logical channel 103 has a transport block size of 30 (TB Size=30), a TBSS of 150 (TBS Size=150), and a logical channel priority of 3 (MLP=3). The fourth logical channel 104 has a transport block size of 200 (TB Size=200), a TBSS of 300 (TBS Size=300), and a logical channel priority of 2 (MLP=2). The fifth logical channel 105 has a transport block size of 100 (TB Size=100), a TBSS of 100 (TBS Size=100), and a logical channel priority of 1 (MLP=1). As described above, since the transport format selection requires the logical channel priorities, the logical channels have five logical channel priorities from 1 to 5.

Figure 12:
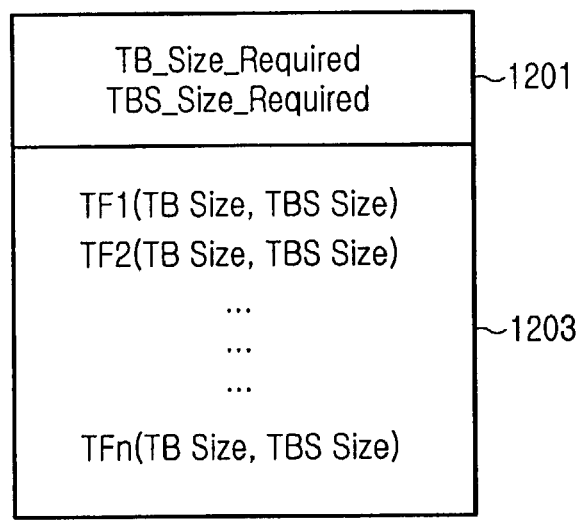
FIG. 12 schematically illustrates a structure of a subset according to another embodiment of the present invention.

FIG. 12 schematically illustrates a structure of a subset according to another embodiment of the present invention. Referring to FIG. 12, TB_SIZE_REQUIRED and TBS_SIZE_REQUIRED in the upper block 1201 represent a transport block size and a transport block size, which should be supported, respectively. The lower block 1203 contains a plurality of transport format sets available in the transport format subset, one or more of which can be selected if possible. Further, TFn (TB Size, TBS Size) in the lower block 1203 supports a transport block size of TB Size and represents the $n^{th}$ transport format of TBS Size (TBSS).

A process of selecting a transport format combination from a transport format subset for the fifth logical channel 105 and the fourth logical channel 104 from among the logical channels of FIG. 11 will be described herein below.

First, a process of selecting a transport format combination for the fifth logical channel 105 having a priority of 1 will be described.

Figure 13:
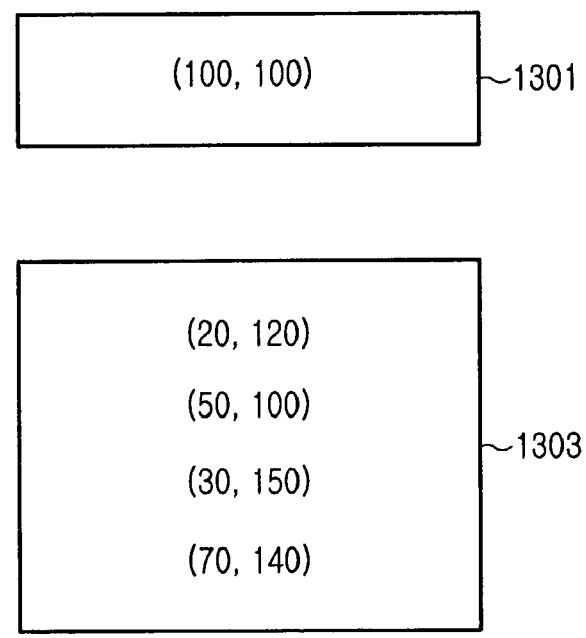
FIG. 13 is a schematic view for describing the selection of a transport format combination for the fifth logical channel illustrated in FIG. 11.

FIG. 13 is a schematic view for describing the selection of a transport format combination for the fifth logical channel 105 of FIG. 11. Since the fifth logical channel 105 has the highest logical channel priority from among the five logical channels, the transport format combination for the fifth logical channel 105 is selected first. The selection of the transport format combination for the fifth logical channel 105 will be described for the two cases as follows.

(1) In a case of a subset 1301 where only one transport format is available and the transport block size of 100 can be supported by the available transport format:

The transport block size of 100 is a size corresponding to the transport block size and the TBSS of the fifth logical channel 105. Therefore, the transport format TF (100, 100) is selected as a transport format for the fifth logical channel 105, and a TB having a logical channel priority of 0 is transmitted.

(2) In a case of a subset 1303 where a plurality of transport formats are available, but the transport block size of 100 can be supported by none of the available transport formats:

Since either the transport block size or the TBSS of the fifth logical channel 105 is 100, none of the transport formats can be selected as the transport format for the fifth logical channel 105. Therefore, transport format selection is impossible.

Second, a process of selecting a transport format combination for the fourth logical channel 104 having the priority of 2 will be described.

Figure 14:
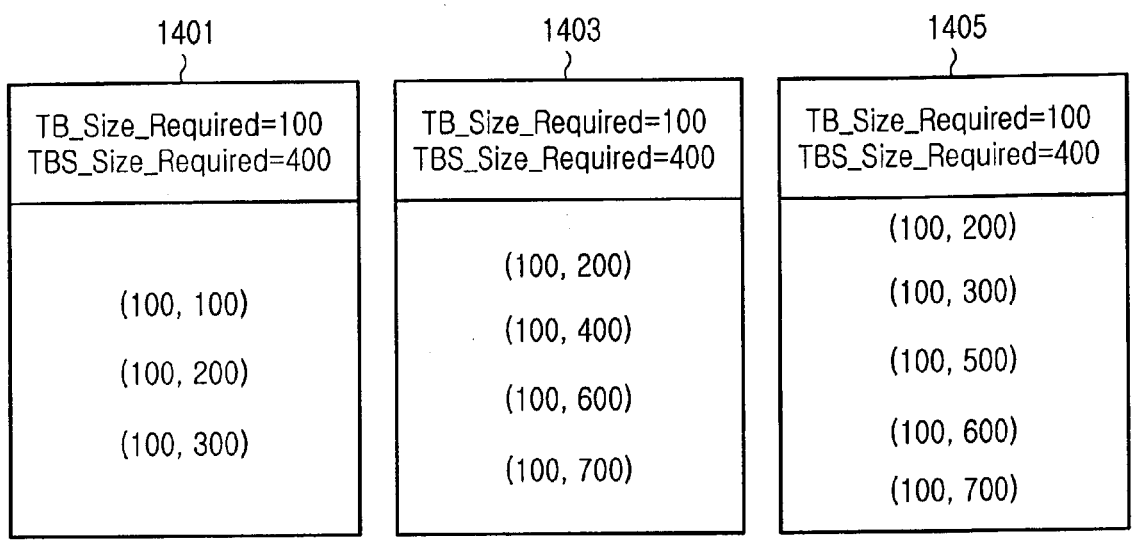
FIG. 14 is a schematic view for describing the selection of a transport format combination for the fourth logical channel illustrated in FIG. 11.

FIG. 14 is a schematic view for describing the selection of a transport format combination for the fourth logical channel 104 of FIG. 11. The selection of the transport format combination for the fourth logical channel 104 will be described for the three cases as follows.

(1) In a case of a subset 1401 where all transport formats of the subset have TBSSs, each of which is smaller than the TBSS TBS_Size_Required, which should be supported (TBS_Size<TBS_Size_Required):

A transport format TF(100, 300) having the largest block size in the subset is selected.

(2) In a case of a subset 1403 where all transport formats of the subset have transport block sizes, each of which is equal to TB_Size_Required:

Transport formats having TBSSs each of which is larger than TBS_Size_Required (TBS_Size≧TBS_Size_Required) are selected. That is, transport formats TF(100, 400), TF(100, 600), and TF(600, 700) are selected.

(3) In a case of a subset 1403 where some transport formats of the subset have transport block sizes each of which is larger than TBS_Size_Required and the other transport formats of the subset have transport block sizes each of which is smaller than TBS_Size_Required, but none of the transport formats of the subset have transport block sizes, each of which is equal to TBS_Size_Required:

All transport formats having transport block sizes each of which is larger than TBS_Size_Required are selected together with one transport format having a transport block size which is next-smaller than TBS_Size_Required, which means the transport format TF(100, 300). In other words, all transport formats but TF(100, 200) are selected.

Next, a process of selecting transport formats from a plurality of subsets according to an embodiment of the present invention will be described with reference to FIGS. 15A to 15F.

FIGS. 15A to 15F schematically illustrates status transition of subsets in the process of a transport format selection from the subset according to an embodiment of the present invention.

Figure 15A:
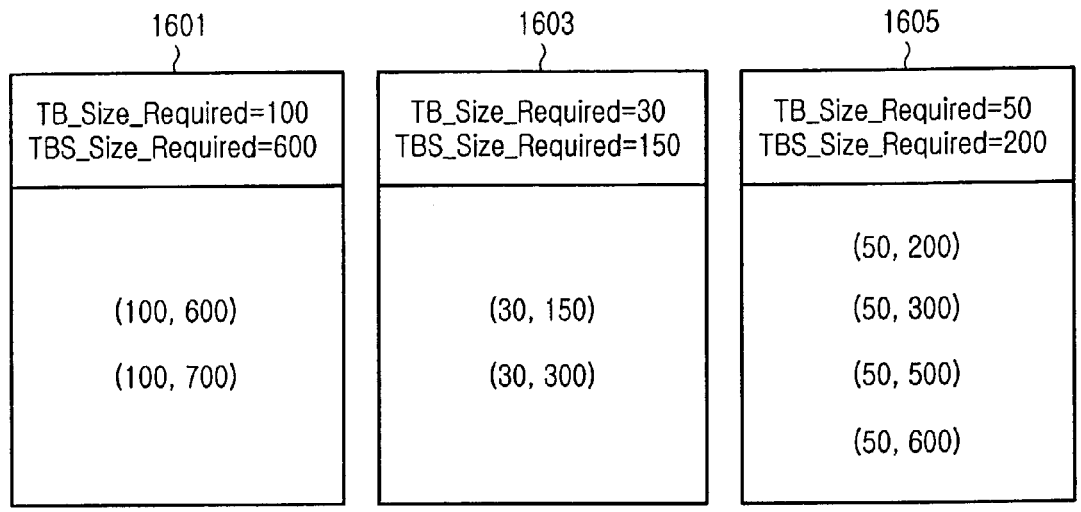
FIGS. 15A to 15F schematically illustrates status transition of subsets in a process of a transport format selection from the subset according to an embodiment of the present invention.
Figure 15B:
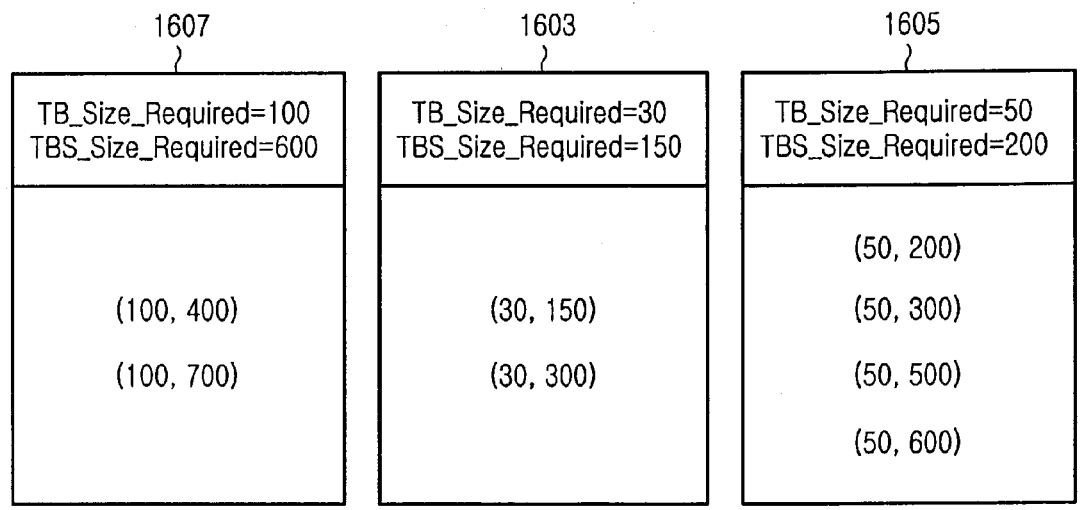

First, referring to FIG. 15A, three transport format subsets, which include a first format subset 1601, a second format subset 1603, and a third format subset 1605, are selected on an assumption that five logical channels are transmitted through one transport channel as illustrated in FIG. 11. From among the three transport format subsets, the first format subset 1601 has the highest logical channel priority, the second format subset 1603 has the next highest logical channel priority, and the third format subset 1605 has the lowest logical channel priority.

TBSSs of all transport formats in the first format subset 1601 are compared with the TBS_Size_Required of the first format subset 1601. The transport format TB(100, 600) having a TBSS equal to the TBS_Size_Required of the first format subset 1601 is selected, and then all TBs generated from logical channels having logical channel priorities of 1, 2, and 3 are selected. When the transport format TB(100, 600) has been selected from the first format subset 1601, the status of the first format subset 1601 changes from the status illustrated in FIG. 15A to the status illustrated in FIG. 15B. The three subsets illustrated in each of FIGS. 15A to 15F are the same subsets throughout FIGS. 15A to 15F, although different reference numerals are given to them according to the figures because their statuses change according to the assignment of the transport formats.

After the transport format TB(100, 600) is selected as described above, because the first format subset 1607 has the highest logical channel priority, TBSSs of the transport formats in the first format subset 1607 are compared again with the TBS_Size_Required of the first format subset 1607, and a transport format TB(100, 400) having the next lowest transport block size is selected. Then, all TBs are selected from logical channels having logical channel priorities of 1 and 2. When the transport format TB(100, 400) has been selected from the first format subset 1607, the status of the first format subset 1607 changes from the status illustrated in FIG. 15B to the status illustrated in FIG. 15C. After the transport format TB(100, 400) is selected, another transport format TB(100, 300) is selected from the first format subset 1609 as illustrated FIG. 15C. Further, one TB is selected from the logical channel having a priority of 1, and two TBs are selected from the logical channel having a priority of 2.

Figure 15C:
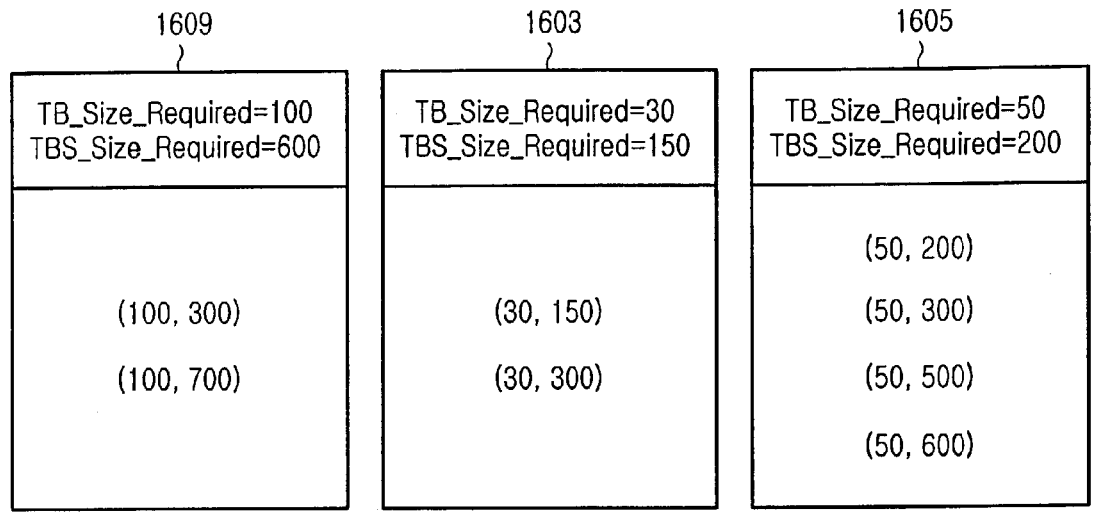
Figure 15D:
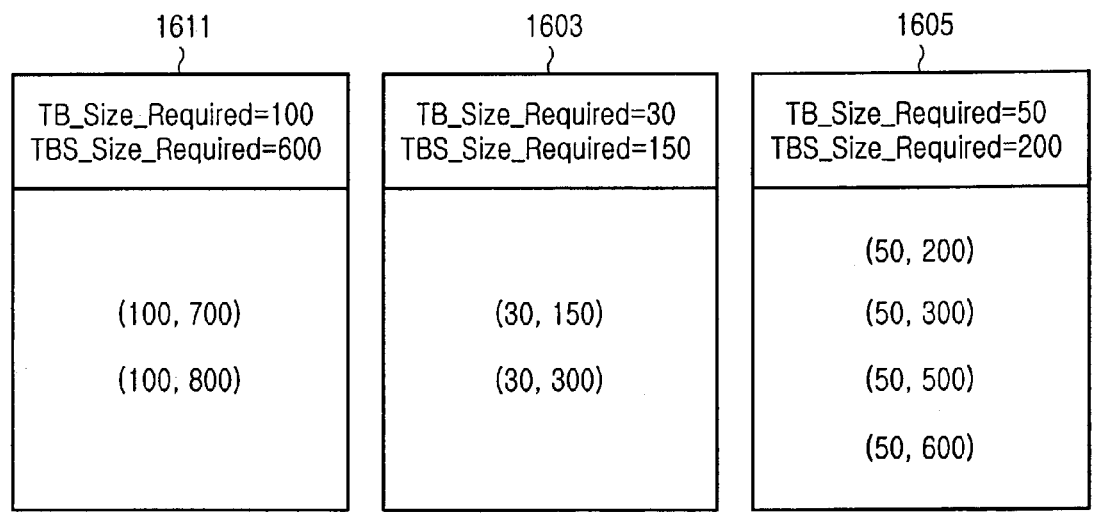

When the transport format TB(100, 300) has been selected from the first format subset 1609 as illustrated in FIG. 15C, the status of the first format subset 1609 changes from the status illustrated in FIG. 15C to the status illustrated in FIG. 15D.

Referring to FIG. 15D, since each of TBSSs of all transport formats in the first format subset 1611 is larger than the TBS_Size_Required stored in the first format subset 1611, the second transport format subset 1603 is selected. Then, TBSSs of transport formats in the second format subset 1603 are compared with the TBS_Size_Required of the second format subset 1603. As a result, a transport format TB(30, 150) having a TBSS equal to the TBS_Size_Required of the second format subset 1603 is selected. Then, all TBs generated from logical channels having a logical channel priority of 3 are selected.

Figure 15E:
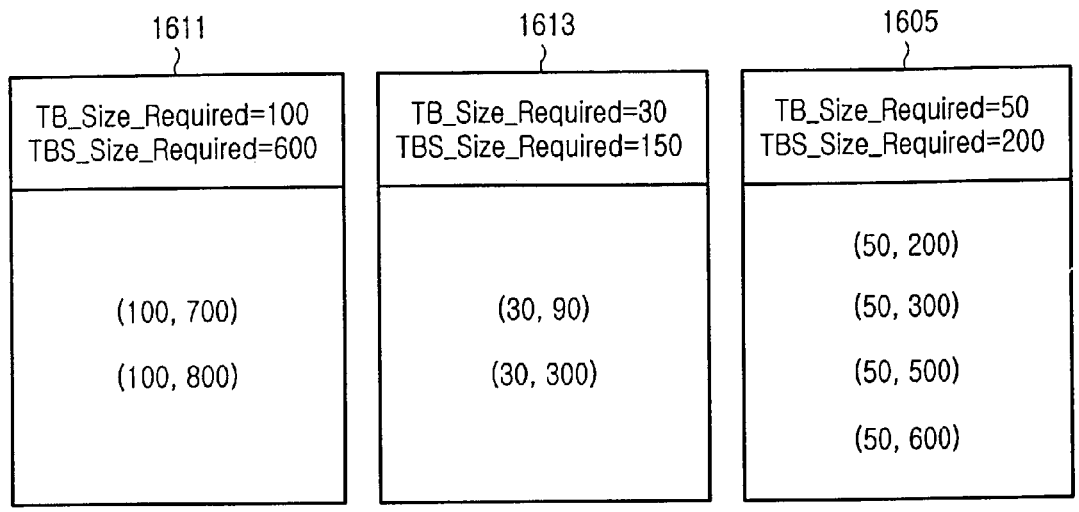

When the transport format TB(30, 150) has been selected from the second format subset 1603 as illustrated in FIG. 15D, the status of the second format subset 1603 changes from the status illustrated in FIG. 15D to the status illustrated in FIG. 15E. Referring to FIG. 15E, a transport format TB(30, 90) having a TBSS smaller than the TBS_Size_Required of the second format subset 1613 is selected, and then three TBs generated from logical channels having a logical channel priority of 3 are selected.

Figure 15F:
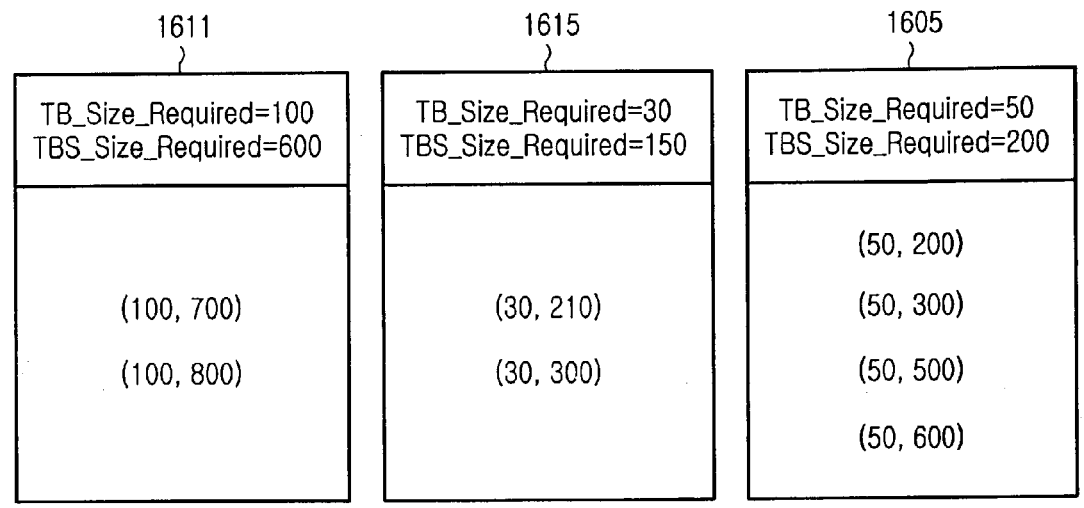

When the transport format TB(30, 90) has been selected from the second format subset 1613 as illustrated in FIG. 15E, the status of the second format subset changes from the status 1613 illustrated in FIG. 15E to the status 1615 illustrated in FIG. 15F. Referring to FIG. 15F, since all transport formats in the first and second format subsets 1611 and 1615 have TBSSs each of which is larger than the TBS_Size_Required, neither the first format subset 1611 nor the second format subset 1615 is considered but a transport format TB(50, 160) of the third format subset 1605 is selected, and then four TBs are selected from logical channels having a logical channel priority of 4.

Hereinafter, a result from simulation of transport format selection utilizing subsets according to the present invention will be briefly compared with a result from simulation of the conventional transport format selection utilizing a transport format table containing all assignable transport formats. When the number of transport formats is 25, the number of multiplexed logical channels is 1, and the type of the transport channel is an uplink dedicated channel, 25 seconds are required in the transport format selection according to the present invention. This is an improvement, as 28 seconds are required in the conventional transport format selection.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of selecting a transport format of transport channels for transmitting transport blocks in a Code Division Multiple Access (CDMA) mobile communication system including a Radio Link Control (RLC) layer and a Medium Access Control (MAC) layer, wherein the RLC layer contains a plurality of logical channels, converts a received service data unit into a Protocol Data Unit (PDU), and transmits the PDU to the MAC layer through a specific logical channel from among the logical channels, and wherein the MAC layer contains a plurality of transport channels, converts the PDU into a transport block, and transmits the transport block to a physical layer entity through a specific transport channel from among the transport channels, the method comprising the steps of:

generating a plurality of subset tables by generating transport formats, which contain logical channel information constituting a corresponding transport channel, for the transport channels;

classifying the transport formats according to transport block sizes that can be transmitted by corresponding transport channels;

providing an indicator to each of the transport formats classified according to the transport block sizes;

converting the PDU into the transport block and detecting a subset table having a transport block size equal to that of the transport block from among the subset tables when the PDU is received through the specific logical channel from the MAC layer after the subset tables are generated; and selecting a transport format corresponding to a specific indicator from indicators stored in the detected subset table as a transport format of the transport channel for transmitting the transport block, the specific indicator containing logical channel information of the specific logical channel.

2. The method according to claim 1, further comprising a step of deleting the specific indicator from the detected subset table.

3. A method of selecting a transport format of transport channels for transmitting transport blocks in a Code Division Multiple Access (CDMA) mobile communication system including a Radio Link Control (RLC) layer and a Medium Access Control (MAC) layer, wherein the RLC layer contains a plurality of logical channels, converts a received service data unit into a Protocol Data Unit (PDU), and transmits the PDU to the MAC layer through a specific logical channel from among the logical channels, and wherein the MAC layer contains a plurality of transport channels, converts the PDU into a transport block, and transmits the transport block to a physical layer through a specific transport channel from among the transport channels, the method comprising the steps of:

generating a plurality of subset tables by generating transport formats, which contain logical channel information constituting a corresponding transport channel, for the transport channels;

classifying the transport formats according to transport block sizes that can be transmitted by corresponding transport channels;

providing an indicator to each of the transport formats classified according to the transport block sizes;

when PDUs are received through a plurality of logical channels from the MAC layer after the subset tables are generated, converting the received PDUs into transport blocks, selecting a logical channel having a highest priority from the plurality of logical channels, and detecting a first subset table from a first transport block transferred through the logical channel having the highest priority, the first subset table having a transport block size equal to that of the first transport block; and selecting a transport format corresponding to a specific indicator from indicators stored in the first subset table as a transport format of a first transport channel through which the first transport block will be transmitted, the specific indicator containing logical channel information of the first transport block.

4. The method according to claim 3, further comprising a step of deleting the specific indicator, which has been selected as the transport format of the first transport channel, from the first subset table.

5. The method according to claim 3, further comprising the steps of:

after the transport format of the first transport channel is selected, detecting a second subset table from a second transport block corresponding to a logical channel having a highest priority from among logical channels of other transport blocks than the first transport block, the second subset table having a transport block size equal to that of the second transport block; and selecting a transport format corresponding to a specific indicator from indicators stored in the second subset table as a transport format of a second transport channel through which the second transport block will be transmitted, the specific indicator containing logical channel information of the second transport block.

6. A method of selecting a transport format of a transport channel for transmitting input data in a Code Division Multiple Access (CDMA) mobile communication system including a Radio Link Control (RLC) layer and a medium access control (MAC) layer, wherein the RLC layer contains a plurality of logical channels, and transmits input data to the MAC layer through a specific logical channel from among the logical channels, and wherein the MAC layer contains a plurality of transport channels, transmits the input data to a physical layer through a specific transport channel from among the transport channels, and selects the transport format of the transport channel, the method comprising the steps of:

- generating transport formats, which contain logical channel information mapped onto a corresponding transport channel, for the transport channels;
- classifying the transport formats according to sizes of data that can be transmitted by corresponding transport channels;
- providing an indicator to each of the transport formats classified according to the sizes of data;
- generating a plurality of subset tables, each of the subset tables containing elements that are indicators provided to transport formats having an equal data size;
- detecting a subset table having a size equal to that of the data input to the MAC layer when the data is input to the MAC layer entity through the specific logical channel after the subset tables are generated; and
- selecting a transport format corresponding to a specific indicator from indicators stored in the detected subset table as the transport format of the transport channel for transmitting the data input to the MAC layer, the specific indicator containing logical channel information of the specific logical channel.

7. The method according to claim 6, further comprising a step of deleting the specific indicator from the detected subset table.

8. The method according to claim 6, wherein, when a plurality of data units are simultaneously input to the MAC layer through a plurality of logical channels, the MAC layer selects the transport format from a data unit transmitted through a logical channel having a highest priority from among the plurality of logical channels.

* * * * *